United States Patent
Gunnarsson et al.

(10) Patent No.: US 12,192,813 B2
(45) Date of Patent: Jan. 7, 2025

(54) SFTD AND ANR SPECIFIC REPORTING

(71) Applicant: Telefonaktiebolaget LM Ericsson (publ), Stockholm (SE)

(72) Inventors: Fredrik Gunnarsson, Linköping (SE); Icaro Leonardo J. Da Silva, Solna (SE); Pradeepa Ramachandra, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/392,473

(22) Filed: Dec. 21, 2023

(65) Prior Publication Data

US 2024/0214850 A1   Jun. 27, 2024

Related U.S. Application Data

(63) Continuation of application No. 16/962,789, filed as application No. PCT/IB2019/051392 on Feb. 20, 2019, now Pat. No. 11,895,520.

(60) Provisional application No. 62/632,861, filed on Feb. 20, 2018.

(51) Int. Cl.
*H04W 24/10* (2009.01)
*H04W 56/00* (2009.01)

(52) U.S. Cl.
CPC ......... *H04W 24/10* (2013.01); *H04W 56/007* (2013.01)

(58) Field of Classification Search
CPC ............................ H04W 24/10; H04W 56/007
See application file for complete search history.

(56) References Cited

U.S. PATENT DOCUMENTS

| 11,206,563 B2 | 12/2021 | Tsai et al. |
| 2014/0087715 A1 | 3/2014 | Suzuki et al. |
| 2015/0131553 A1 | 5/2015 | Centonza et al. |
| 2017/0257788 A1 | 9/2017 | Takahashi et al. |

(Continued)

FOREIGN PATENT DOCUMENTS

| CN | 106134241 A | 11/2016 |
| RU | 2600456 C1 | 10/2016 |

(Continued)

OTHER PUBLICATIONS

Author Unknown, "Technical Specification Group Core Network and Terminals; Numbering, addressing and identification (Release 15)," Technical Specification 23.003, Version 15.2.0, Dec. 2017, 3GPP Organizational Partners, 116 pages.

(Continued)

*Primary Examiner* — Kevin D Mew

(57) ABSTRACT

Systems and methods for System Frame Number (SFN) Frame Time Difference (SFTD) reporting are disclosed. Embodiments of a method of operation of a User Equipment (UE) in a wireless network to perform SFTD measurements between a Primary Cell (PCell) of the UE and one or more other cells is provided. In some embodiments, the method comprises receiving, from a network node in the wireless network, a list of cells for which the UE can report SFTD measurements. The method further comprises performing SFTD measurements and reporting the SFTD measurements in accordance with the list of cells for which the UE can report SFTD measurements. In this manner, SFTD reporting is provided in an efficient manner.

19 Claims, 9 Drawing Sheets

(56) References Cited

U.S. PATENT DOCUMENTS

| | | | | |
|---|---|---|---|---|
| 2019/0215711 | A1* | 7/2019 | Tsai | H04B 17/309 |
| 2019/0261444 | A1* | 8/2019 | Axmon | H04W 76/28 |
| 2019/0313272 | A1 | 10/2019 | Zhou et al. | |
| 2020/0092738 | A1 | 3/2020 | Ahlstrom et al. | |
| 2020/0413358 | A1* | 12/2020 | Harada | H04W 56/001 |
| 2021/0037435 | A1 | 2/2021 | Ahlstrom et al. | |
| 2021/0051618 | A1 | 2/2021 | Yang et al. | |
| 2022/0038934 | A1 | 2/2022 | Kumar et al. | |
| 2022/0038968 | A1* | 2/2022 | Latheef | H04W 36/0085 |
| 2023/0069951 | A1 | 3/2023 | Araujo et al. | |

FOREIGN PATENT DOCUMENTS

| | | | |
|---|---|---|---|
| WO | 2019160266 | A1 | 8/2019 |
| WO | 2019162861 | A1 | 8/2019 |
| WO | 2020076229 | A1 | 4/2020 |
| WO | 2020263165 | A1 | 12/2020 |

OTHER PUBLICATIONS

Author Unknown, "Technical Specification Group Services and System Aspects; Architecture enhancements for non-3GPP accesses (Release 15)," Technical Specification 23.402, Version 15.2.0, Dec. 2017, 3GPP Organizational Partners, 314 pages.
Author Unknown, "Technical Specification Group Radio Access Network; Requirements for support of radio resource management (TDD) (Release 15)," Technical Specification 25.123, Version 15.1.0, Dec. 2017, 3GPP Organizational Partners, 454 pages.
Author Unknown, "Technical Specification Group Radio Access Network; Requirements for support of radio resource management (FDD) (Release 15)," Technical Specification 25.133, Version 15.1.0, Dec. 2017, 3GPP Organizational Partners, 410 pages.
Author Unknown, "Technical Specification Group Radio Access Network; Evolved Universal Terrestrial Radio Access (E-UTRA); Requirements for support of radio resource management (Release 15)," Technical Specification 36.133, Version 15.1.0, Dec. 2017, 3GPP Organizational Partners, 2,994 pages.
Author Unknown, "Technical Specification Group Radio Access Network; Evolved Universal Terrestrial Radio Access (E-UTRA); Physical layer; Measurements (Release 15)," Technical Specification 36.214, Version 15.0.1, Jan. 2018, 3GPP Organizational Partners, 23 pages.
Author Unknown, "Technical Specification Group Radio Access Network; Evolved Universal Terrestrial Radio Access (E-UTRA); User Equipment (UE) procedures in idle mode (Release 14)," Technical Specification 36.304, Version 14.5.0, Dec. 2017, 3GPP Organizational Partners, 49 pages.
Author Unknown, "Technical Specification Group Radio Access Network; Evolved Universal Terrestrial Radio Access (E-UTRA); Layer 2—Measurements (Release 14)," Technical Specification 36.314, Version 14.0.0, Mar. 2017, 3GPP Organizational Partners, 23 pages.
Author Unknown, "Technical Specification Group Radio Access Network; Evolved Universal Terrestrial Radio Access (E-UTRA); Medium Access Control (MAC) protocol specification (Release 15)," Technical Specification 36.321, Version 15.0.0, Dec. 2017, 3GPP Organizational Partners, 109 pages.
Author Unknown, "Technical Specification Group Radio Access Network; NR; Radio Resource Control (RRC) protocol specification (Release 15)," Technical Specification 38.331, Version 15.0.0, Dec. 2017, 3GPP Organizational Partners, 188 pages.
Ericsson, "Introduction of inter-RAT SFTD measurement requirement", 3GPP TSG-RAN WG4 Meeting #86, Athens 3reece, Feb. 26, 2018, pp. 1-4, R4-1802430 CR 36.133, 3GPP.
Ericsson, "TP for SFTD measurements for 36.331 for non-serving cells {E407}", 3GPP TSG-RAN WG2 #101, Il.thens, Greece, Feb. 26-Mar. 2, 2018, pp. 1-36, R2-1803325, 3GPP.
Huawei et al., "Discussion on SSTD measurement configuration for non-configured cell", 3GPP TSG-RAN WG2 Meeting #101, Athens, Greece, Feb. 26-Mar. 2, 2018, pp. 1-22, R2-1802520, 3GPP.
Media Tek Inc., "On SFTD measurement before PSCell configuration", 3GPP TSG-RAN WG4 AH1801 Meeting, San Diego, CA, USA, Jan. 21-26, 2017, pp. 1-4, R4-1800112, 3GPP.
Media Tek Inc., "Sstd Design in En-Dc", 3GPP TSG-RAN WG2 Meeting AH-1801, Vancouver, Canada, Jan. J2-26, 2018, pp. 1-30, R2-1800972, 3GPP.
NTT Docomo, Inc., "Inter-RAT SFTD measurement for EN-DC when PSCell is not configured", 3GPP TSG-RAN i/VG4 Meeting #86, Athens, Greece, Feb. 26-Mar. 2, 2018, pp. 1-2, R4-1802515, 3GPP.
NTT Docomo, Inc., "SFTD measurement for asynchronous LTE-NR DC", 3GPP TSG-RAN WG4 Meeting AH-1801, San Diego, United States, Jan. 22-26, 2018, pp. 1-3, R4-1800569, 3GPP.
First Office Action for Chinese Patent Application No. 201980014486.5, mailed Apr. 22, 2023, 11 pages.
Examination Report for European Patent Application No. 19712279.9, mailed Aug. 26, 2022, 8 pages.
Intention to Grant for European Patent Application No. 19712279.9, mailed Jun. 16, 2023, 8 pages.
Notice of Reasons for Refusal for Japanese Patent Application No. 2020-543775, mailed Sep. 14, 2021, 8 pages.
Decision of Refusal for Japanese Patent Application No. 2020-543775, mailed May 17, 2022, 5 pages.
Reconsideration Report by Examiner before Appeal for Japanese Patent Application No. 2020-543775, mailed Nov. 17, 2022, 4 pages.
Trial and Appeal Decision for Japanese Patent Application No. 2020-543775, mailed Apr. 11, 2023, 4 pages.
Notice of Reasons for Refusal for Japanese Patent Application No. 2022-149003, mailed Jul. 4, 2023, 4 pages.
Office Action for Korean Patent Application No. 10-2020-7023989, mailed May 28, 2021, 11 pages.
Office Action for Korean Patent Application No. 10-2020-7023989, mailed Nov. 8, 2021, 9 pages.
Office Action for Korean Patent Application No. 10-2020-7023989, mailed May 30, 2022, 6 pages.
Written Decision on Registration for Korean Patent Application No. 10-2020-7023989, mailed Sep. 27, 2022, 6 pages.
Non-Final Office Action for U.S. Appl. No. 16/962,789, mailed Jan. 10, 2022, 9 pages.
Final Office Action for U.S. Appl. No. 16/962,789, mailed May 27, 2022, 9 pages.
Non-Final Office Action for U.S. Appl. No. 16/962,789, mailed Feb. 7, 2023, 8 pages.
Notice of Allowance for U.S. Appl. No. 16/962,789, mailed Sep. 26, 2023, 11 pages.

* cited by examiner

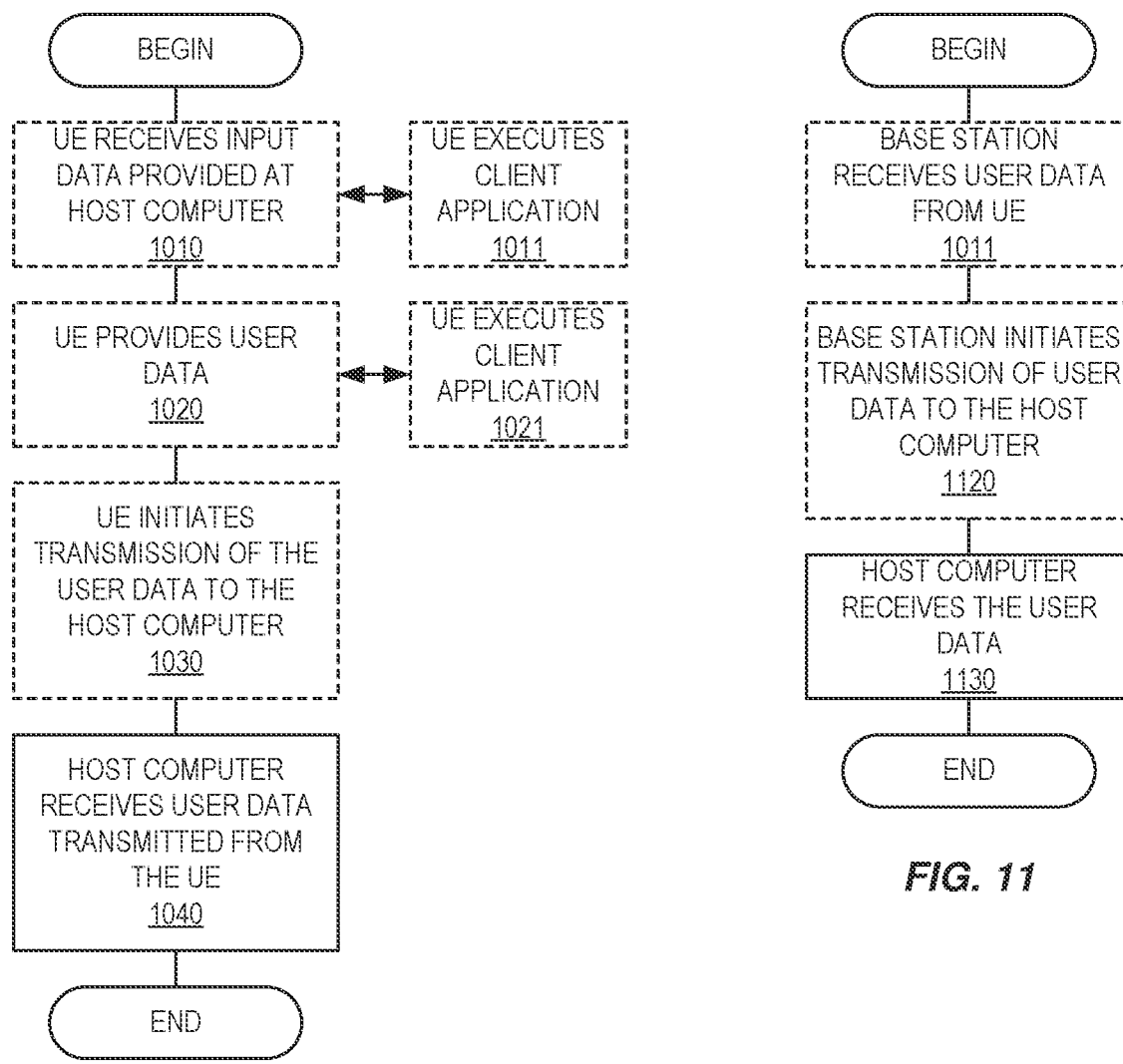

SFTD AND ANR SPECIFIC REPORTING

RELATED APPLICATIONS

The present application is a continuation of U.S. patent application Ser. No. 16/962,789, filed Jul. 16, 2020, which is a 371 of International Application No. PCT/IB2019/051392, filed Feb. 20, 2018, which claims the benefit of and priority to U.S. Provisional Patent Application No. 62/632,861, filed Feb. 20, 2018, entitled "SFTD AND ANR SPECIFIC REPORTING," the disclosures of which are hereby incorporated herein by reference in their entirety.

TECHNICAL FIELD

The present disclosure relates to a wireless network and, more specifically, to System Frame Number (SFN) Frame Time Difference (SFTD) reporting and Automatic Neighbor Relations (ANR) reporting in a cellular communications network.

BACKGROUND

Reporting Configuration in New Radio (NR)

The Evolved Universal Terrestrial Radio Access Network (E-UTRAN) Dual Connectivity (EN-DC) essential reporting configurations for NR have been already agreed in Third Generation Partnership Project (3GPP) RAN2 forum and are also captured in the Radio Resource Control (RRC) specifications (see 3GPP Technical Specification (TS) 38.331 v15.0.1). Based on these reporting configurations, the network can configure the User Equipment (UE) to report periodically or based on certain event triggers. Currently, standardized event triggers are based on Long Term Evolution (LTE) like events i.e., A1-A6 events. In addition to event triggered and periodical report triggering, there is also a place holder for "reportCGI", which is used for Automatic Neighbor Relations (ANR) specific purposes. The reporting configurations are provided in the information element ReportConfigNR, which is described in the following excerpt from 3GPP TS 38.311 v15.0.1:

ReportConfigNR

The IE ReportConfigNR specifies criteria for triggering of an NR measurement reporting event. Measurement reporting events are based on cell measurement results, which can either be derived based on SS/PBCH block or CSI-RS. These events are labelled AN with N equal to 1, 2 and so on.

Event A1: Serving becomes better than absolute threshold;

Event A2: Serving becomes worse than absolute threshold;

Event A3: Neighbour becomes amount of offset better than PCell/PSCell;

Event A4: Neighbour becomes better than absolute threshold;

Event A5: PCell/PSCell becomes worse than absolute threshold1 AND Neighbour becomes better than another absolute threshold2.

Event A6: Neighbour becomes amount of offset better than SCell.

| ReportConfigNR information element |
|---|
| ```
-- ASN1START
-- TAG-REPORT-CONFIG-START
ReportConfigNR : :=          SEQUENCE {
    reportType                   CHOICE {
        periodical                   PeriodicalReportConfig,
        eventTriggered               EventTriggerConfig,
-- reportCGI is to be completed before the end of Rel-15.
        reportCGI                    ENUMERATED {ffsTypeAndValue},
        ...
    }
}
-- FFS / TODO: Consider separating trgger configuration (trigger, periodic, ...) from report
configuation.
-- Current structure allows easier definition of new events and new report types e.g. CGI, etc.
EventTriggerConfig : :=     SEQUENCE {
    eventId                      CHOICE {
        eventA1                      SEQUENCE {
            a1-Threshold                 MeasTriggerQuantity,
            reportOnLeave                BOOLEAN,
            hysteresis                   Hysteresis,
            timeToTrigger                TimeToTrigger
        },
        eventA2                      SEQUENCE {
            a2-Threshold                 MeasTriggerQuantity,
            reportOnLeave                BOOLEAN,
            hysteresis                   Hysteresis,
            timeToTrigger                TimeToTrigger
        },
        eventA3                      SEQUENCE {
            a3-Offset                    MeasTriggerQuantityOffset,
            reportOnLeave                BOOLEAN,
            hysteresis                   Hysteresis,
            timeToTrigger                TimeToTrigger,
            useWhiteCellList             BOOLEAN
        },
        eventA4                      SEQUENCE {
            a4-Threshold                 MeasTriggerQuantity,
            reportOnLeave                BOOLEAN,
            hysteresis                   Hysteresis,
            timeToTrigger                TimeToTrigger,
            useWhiteCellList             BOOLEAN
``` |

| ReportConfigNR information element |
| --- |

```
      },
      eventA5              SEQUENCE {
        a5-Threshold1        MeasTriggerQuantity,
        a5-Threshold2        MeasTriggerQuantity,
        reportOnLeave        BOOLEAN,
        hysteresis           Hysteresis,
        timeToTrigger        TimeToTrigger,
        useWhiteCellList     BOOLEAN
      },
      eventA6              SEQUENCE {
        a6-Offset            MeasTriggerQuantityOffset,
        reportOnLeave        BOOLEAN,
        hysteresis           Hysteresis,
        timeToTrigger        TimeToTrigger,
        useWhiteCellList     BOOLEAN
      },
      ...
    },
    rsType                ENUMERATED {ssb, csi-rs},
    -- Common reporting config (at least to periodical and eventTriggered)
    reportInterval        ReportInterval,
    reportAmount          ENUMERATED {r1, r2, r4, r8, r16, r32, r64, infinity),
    -- Cell reporting configuration
    reportQuantityCell    MeasReportQuantity,
    maxReportCells        INTEGER (1..maxCellReport),
    -- RS index reporting configuration
    reportQuantityRsIndexes   MeasReportQuantity OPTIONAL, -- Need M
      maxNrofRSIndexesToReport INTEGER (1. .maxNrofIndexesToReport) OPTIONAL, -- Need M
    includeBeamMeasurements    BOOLEAN,
    -- If configured the UE includes the best neighbour cells per serving frequency
    reportAddNeighMeas    ENUMERATED {setup}
    OPTIONAL, -- Need R
    ...
}
PeriodicalReportConfig : :=   SEQUENCE {
    rsType                ENUMERATED {ss, csi-rs},
    -- Common reporting config (at least to periodical and eventTriggered)
    reportInterval        ReportInterval,
    reportAmount          ENUMERATED {r1, r2, r4, r8, r16, r32, r64, infinity},
    -- Cell reporting configuration
    reportQuantityCell    MeasReportQuantity,
    maxReportCells        INTEGER (1..maxCellReport),
    -- RS index reporting configuration
    reportQuantityRsIndexes   MeasReportQuantity OPTIONAL, -- Need R
    maxNrofRsIndexesToReport  INTEGER (1. .maxNrofIndexesToReport) OPTIONAL, -- Need R
    includeBeamMeasurements    BOOLEAN,
    ...
}
MeasTriggerQuantity : :=   CHOICE {
    rsrp                  RSRP-Range,
    rsrq                  RSRQ-Range,
    sinr                  SINR-Range
}
MeasTriggerQuantityOffset : :=   CHOICE{
    rsrp                  INTEGER (ffsValue),
    rsrq                  INTEGER (FFSvALUE),
    sinr                  INTEGER (ffsValue)
}
MeasReportQuantity : :=   SEQUENCE {
    rsrp                  BOOLEAN,
    rsrq                  BOOLEAN,
    sinr                  BOOLEAN
}
-- TAG-REPORT-CONFIG-START
-- ASN1STOP
```

ANR Mechanism in LTE and NR

With the introduction of LTE, support for ANR was introduced, which removed, or significantly decreased, the manual configuration work done by the operators for setting up neighbor relations. The ANR function in LTE relies on the always-on transmission of System Information, enabling the UE to retrieve the Enhanced Cell Global Identity (ECGI) of any unknown neighbor cells as part of the ANR solution.

The procedure is illustrated in FIG. 1. In step 1, the UE sends a measurement report to the serving enhanced or evolved Node B (eNB). The measurement report contains the Physical Cell Identity (PCI) of cell B. The eNB then instructs the UE to read the ECGI, the Tracking Area Code (TAC), and all available Public Land Mobile Network (PLMN) Identity(ies) (ID(s)) of cell B. The neighbor cell broadcasts its PLMN IDs, TAC, etc. in the System Information Block 1 (SIB1) message. After measuring these values, the UE reports the detected ECGI to the serving eNB, and the eNB decides to add this neighbor relation. The eNB can use the PCI and ECGI to look up a transport layer address to the new eNB, update the Neighbor Relation list, and, if needed, setup a new X2 interface towards this eNB.

The first standard release for 5th generation mobile networks (i.e., the first standard release for NR) will be for non-standalone (NSA) NR networks, utilizing existing LTE radio and Evolved Packed Core (EPC) network with the addition of an NR carrier. The NSA NR nodes will always have an LTE node as a master node, and System Information need not to be transmitted in NR, as the UE will not camp in NR. For the UE to aid in the ANR procedure, the reporting configuration of NR already has a place holder for reporting the CGI of the unknown neighbor cell. The place holder is called "reportCGI". However, details of how to configure such a reporting configuration are not finalized yet.

Single Frequency Network (SFN)—Frame Time Difference (SFTD) Reporting

In LTE, SFN and Subframe Time Difference (SSTD) measurement configuration was used to get the time difference between the Primary Cell (PCell) and the Primary Secondary Cell (PSCell). In Release 15, for EN-DC purposes, it has been agreed that the SFTD measurements can be configured by the Master eNB (MeNB), and the report received by the MeNB will be forwarded to the Secondary gNB (SgNB) (where "gNB" denotes a NR base station) so that both nodes are aware of the time difference between each other. Further, it was agreed that the SSTD measurement reporting is extended for cells that not configured in the case that no PSCell is configured. This is useful in aiding the network to configure relevant Sync signal Measurement Timing Configuration (SMTC) windows.

comprises receiving, from a network node in the wireless network, a list of cells for which the UE can report SFTD measurements. The method further comprises performing SFTD measurements and reporting the SFTD measurements in accordance with the list of cells for which the UE can report SFTD measurements. In this manner, SFTD reporting is provided in an efficient manner.

In some embodiments, performing SFTD measurements comprises performing an SFTD measurement between the PCell of the UE and a second cell, the second cell being a cell in the list of cells for which the UE can report SFTD measurements. Further, reporting the SFTD measurements in accordance with the list of cells for which the UE can report SFTD measurements comprises reporting the SFTD measurement to the network node.

In some embodiments, the list of cells comprises one or more New Radio (NR) cells. Further, in some embodiments, the PCell is a Long Term Evolution (LTE) cell. In some embodiments, reporting the SFTD measurements in accordance with the list of cells for which the UE can report SFTD measurements comprises reporting the SFTD measurements, in accordance with the list of cells for which the UE can report SFTD measurements, when no NR cell is configured as a Primary Secondary Cell (PSCell) of the UE. In some embodiments, the method further comprises, when an NR cell is configured as a PSCell for the UE, performing a SFTD measurement between the PCell of the UE and the NR PSCell and reporting the SFTD measurement between the PCell of the UE and the NR PSCell.

In some embodiments, receiving the list of cells for which the UE can report SFTD measurements comprises receiving a Radio Resource Control (RRC) Connection Reconfiguration message comprising the list of cells for which the UE can report SFTD measurements or receiving an RRC Con-

| Agreements from RAN2#99bis: | |
| --- | --- |
| 1: | SSTD measurements for EN-DC are supported with the following principles (as in LTE): |
| a. | MeNB can configure SFN/subframe offset reporting for PSCell only when EN-DC is configured. |
| b. | UE only needs to read MIB to measure/report SFN/subframe offset. |
| c. | MeNB forwards the SFN/subframe offset from MeNB to SgNB using "SCG-ConfigInfo" (FFS on IE name). |
| d. | One shot reporting (i.e. eNB configures measurement and UE sends single report to eNB, not periodical). |
| Agreements from RAN2#100: | |
| 1: | The network can configure the NR SSTD measurement whenever a NR PSCell is configured |
| 2: | NR SSTD measurement reporting is extended for cells that are not yet configured in the case that no NR PSCell is configured |

There currently exist certain challenges. In the existing reporting configuration of NR, there is a place holder for reporting CGI. However, the details of this configuration are yet to be standardized. Additionally, the SFTD reporting configuration is under discussion in NR and the details of this configuration are not yet specified.

SUMMARY

Systems and methods for System Frame Number (SFN) Frame Time Difference (SFTD) reporting are disclosed. Embodiments of a method of operation of a User Equipment (UE) in a wireless network to perform SFTD measurements between a Primary Cell (PCell) of the UE and one or more other cells is provided. In some embodiments, the method nection Resume message comprising the list of cells for which the UE can report SFTD measurements.

Embodiments of a UE are also disclosed. In some embodiments, a UE for performing SFTD measurements between a PCell of the UE and one or more other cells in a wireless network is adapted to receive, from a network node in the wireless network, a list of cells for which the UE can report SFTD measurements. The UE is further adapted to perform SFTD measurements and report the SFTD measurements in accordance with the list of cells for which the UE can report SFTD measurements.

In some embodiments, a UE for performing SFTD measurements between a PCell of the UE and one or more other cells in a wireless network comprises an interface comprising radio front-end circuitry and processing circuitry associated with the interface. The processing circuitry is operable to cause the UE to receive, from a network node in the wireless network, a list of cells for which the UE can report SFTD measurements, perform SFTD measurements, and report the SFTD measurements in accordance with the list of cells for which the UE can report SFTD measurements.

In some embodiments, the SFTD measurements comprise a SFTD measurement between the PCell of the UE and a second cell, the second cell being a cell in the list of cells for which the UE can report SFTD measurements.

In some embodiments, the list of cells comprises one or more NR cells. Further, in some embodiments, the PCell is a LTE cell. In some embodiments, in order to report the SFTD measurements in accordance with the list of cells for which the UE can report SFTD measurements, the processing circuitry is further configured to cause the UE to report the SFTD measurements, in accordance with the list of cells for which the UE can report SFTD measurements, when no NR cell is configured as a PSCell of the UE. Further, in some embodiments, the processing circuitry is further configured to cause the UE to, when a NR cell is configured as a PSCell for the UE, perform a SFTD measurement between the PCell of the UE and the NR PSCell and report the SFTD measurement between the PCell of the UE and the NR PSCell.

In some embodiments, in order to receive the list of cells for which the UE can report SFTD measurements, the processing circuitry is further configured to cause the UE to receive a RRC Connection Reconfiguration message comprising the list of cells for which the UE can report SFTD measurements or receiving an RRC Connection Resume message comprising the list of cells for which the UE can report SFTD measurements.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 8 through 11 are flowcharts illustrating methods implemented in a communication system, in accordance with some embodiments of the present disclosure.

DETAILED DESCRIPTION

Figure 1:
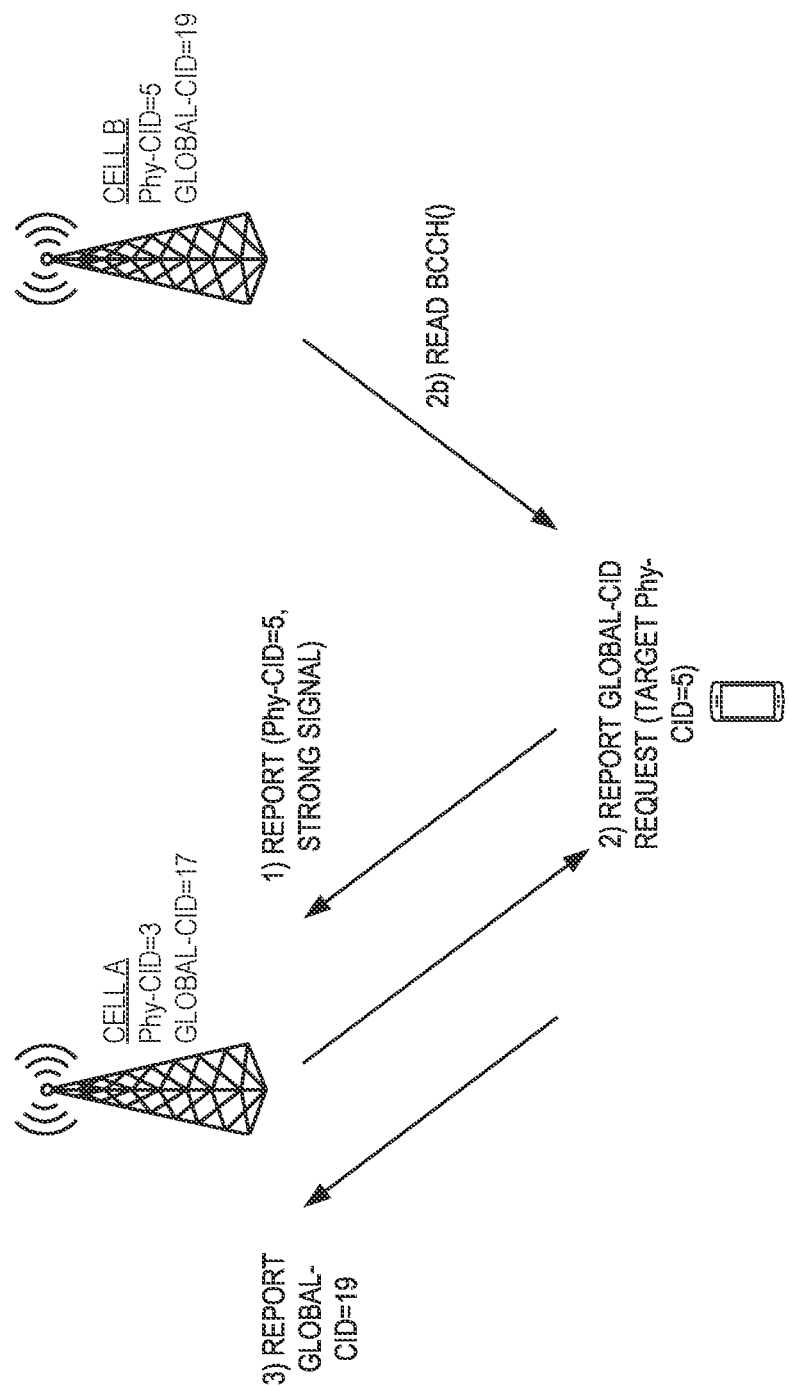
FIG. 1 illustrates an Automatic Neighbor Relations (ANR) procedure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

There currently exist certain challenges. In the existing reporting configuration of Third Generation Partnership Project (3GPP) New Radio (NR), there is a place holder "reportCGI" in the reporting configuration. This placeholder is to be used for reporting Cell Global Identity (CGI) for Automatic Neighbor Relations (ANR) specific purposes. However, the details of this configuration are yet to be standardized. Additionally, the Single Frequency Network (SFN)—Frame Time Difference (SFTD) reporting configuration is under discussion in NR and the details of this configuration are not yet specified.

Certain aspects of the present disclosure and their embodiments may provide solutions to these or other challenges. In this disclosure, embodiments of a reporting configuration for SFTD reporting and ANR related reporting are proposed. With these proposals, ANR can be supported for Non-Standalone (NSA) NR without relying on System Information transmissions from NR, by using existing LTE neighbor relations to find the Internet Protocol (IP) address of any unknown NR nodes.

There are, proposed herein, various embodiments which address one or more of the issues disclosed herein. Certain embodiments may provide one or more of the following technical advantages. For example, the proposed embodiments provide a combined way to provide SFTD reporting and ANR reporting in a compact manner. This may allow for the UE to report SSTD measurements for a list of cells. These and other technical advantages may be readily apparent from the following description. Particular embodiments may provide some, none, or all of these technical advantages.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

1 ANR Specific Configurations

In LTE, the Information Element (IE) reportCGI was configured as part of periodical measurement reporting with periodicity of infinity. Basically, it is a one-shot reporting. In NR, this parameter is already agreed to be part of reportType parameter, but its configuration is for further study and has not been agreed upon yet. Further, improvements have been suggested. For instance, it has been proposed to provide a list of cells for which the User Equipment (UE) is expected to provide CGI reporting. It has also been proposed to configure the cell(s) for which to report the CGI in reportConfig rather than in measObject. However, all the above configurations are based on a report, either event triggered or periodical, received from the UE that contains a Physical Cell Identity (PCI) that is not amongst the known neighbors for the serving cell. It is to be noted that, as in LTE, in the above mechanisms, the UE is unaware of any neighbor list, and the UE cannot pro-actively detect the presence of an unknown neighbor in the area.

In this regard, the following example is provided to show how the reportCGI IE could be included in the ReportConfigNR.

```
ReportConfigNR ::=        SEQUENCE {
    reportType            CHOICE {
        periodical            PeriodicalReportConfig,
        eventTriggered        EventTriggerConfig,
-- reportCGI is to be completed before the end of Rel-15.
        reportCGI             ENUMERATED {ffsTypeAndValue},
        ...
    }
}
```

One solution proposed herein provides a way in which the UE can actively identify a cell which might cause a PCI confusion or a cell which could be potentially not in the neighbor list of the serving cell.

1.1 Additional Neighbor Cell Detection

The UE is configured with Sync signal Measurement Timing Configuration (SMTC) windows that inform the UE as to where to find the Synchronization Signal (SS)/Physical Broadcast Channel (PBCH) blocks (also referred to as SS blocks or SSBs) in the corresponding frequency. All the transmissions of the SS/PBCH blocks should happen within this window. The window can be up to 5 milliseconds (ms) long, and its periodicity can be configured amongst {5,10, 20,40,80,160} ms. The UE is not expected to perform any Radio Resource Management (RRM) measurements outside of this SMTC window.

The SS/PBCH blocks transmitted from a cell will contain Primary Synchronization Signal (PSS), Secondary Synchronization Signal (SSS), and PBCH. The contents of the PBCH will, amongst other things, include the timing index that informs the UE as to whether the detected SS/PBCH block is the first SS/PBCH block from that cell, or a second SS/PBCH block from that cell, or a third SS/PBCH block from that cell, etc. Based on this information, the UE can detect if there is any cell whose SS/PBCH block transmission is falling outside the configured SMTC window. One method that can be used by the UE to do so is given below. Note that this is just an example embodiment and further optimizations can be performed on this. For example, instead of considering every detected SS/PBCH block, the UE may consider only the strongest SS/PBCH block from a given PCI. The example process is as follows:

For each detected SS/PBCH block identifier at the UE
    If the detected SS/PBCH block identifier (beam index) is larger than 1:
        Based on the detected timing index (SS/PBCH block identifier→beam index), find the possible transmission instance of the first SS/PBCH block identifier from that cell
        Check if this first transmission of SS/PBCH block occurs before the start of the SMTC window.
            If so, then the UE declares the detection of a candidate unknown neighbor cell 1.2 PCI Confusion Detection The UE performs SS/PBCH block measurements within the SMTC window. During this time, the UE expects the SS/PBCH block indices from the same cell (e.g., SS/PBCH block indices that have same PCI encoded in PSS+SSS) to arrive in increasing order, as the SS/PBCH block index indicates the timing information. Therefore, if the UE detects two different SS/PBCK blocks from the same cell (e.g., having the same PCI) within the same SMTC window, and if those detected SS/PBCH blocks do not occur in a gradual increasing order, then the UE can declare that there is more than one cell that is covering the area and transmitting the same PCI. This detection could be based on arrival of SS/PBCH blocks in non-ascending order and/or if detected SS/PBCH block indices between successive SS/PBCH transmission locations is not in gradual ascending order, as per the expected transmission sequence. This can be declared as PCI confusion detection.

1.3 ReportConfigNR Contents

Based on the above, the reporting configuration from NR can be updated as follows. This is one embodiment of such a configuration.

If the network would like to get an 'additional neighbor cell detection' related reporting, the network can configure the UE to trigger the measurement report if such a cell is detected by setting a flag reportTriggering in OneShotReportConfig and setting reportPurpose to cellOutsideSMTCWindowDetection or cellOutsideSMTCWindowDetectionORPCIConfusionDetection. In such a report, the UE includes the cell that was detected within the SMTC window but could have other SS/PBCH blocks transmitted prior to the start of the SMTC window.

If the network would like to get an 'PCI confusion detection' related reporting, the network can configure the UE to trigger the measurement report if such a cell is detected by setting a flag reportTriggering in OneShotReportConfig and setting reportPurpose to PCIConfusionDetection or cellOutsideSMTCWindowDetectionORPCIConfusionDetection. In such a report, the UE includes the PCI that was detected to be having potential PCI confusion issue and potentially the UE can also include the GCID of these cells by using autonomous gaps to read the GCID of these cells.

One example of a modified ReportConfigNR IE including the aforementioned aspects to enable additional neighbor cell detection related reporting and PCI confusion detection related reporting is as follows:

ReportConfigNR information element

```
-- ASN1START
-- TAG-REPORT-CONFIG-START
ReportConfigNR ::=                    SEQUENCE {
    reportType                        CHOICE {
        periodical                        PeriodicalReportConfig,
        evenTriggered                     EventTriggerConfig,
```

-continued

| ReportConfigNR information element |
|---|
| ```
-- reportCGI is to be completed before the end of Rel-15.
      oneShotReport                                     OneShotReportConfig,
      ...
   }
}
OneShotReportConfig: :=                              SEQUENCE {
   reportPurpose ENUMERATED {cellOutsideSMTCWindowDetection, PCIConfusionDetection,
cellOutsideSMTCWindowDetectionORPCIConfusionDetection, reportCGI},
   -- Common reporting config (at least to periodical and eventTriggered)
   cellsForWhichToReport        CellIndexList            OPTIONAL, -- Cond R
   reportTriggering             BOOLEAN                  OPTIONAL,
   si-RequestForHO              ENUMERATED {setup}       OPTIONAL, -- Cond reportCGI
   includeMultiBandInfo         ENUMERATED {true}        OPTIONAL, -- Cond reportCGI
}
``` |

| ReportConfigNR field descriptions |
|---|
| cellsForWhichToReport |
| If the field reportPurpose is set to reportCGI, the UE shall acquire the CSG identity, tracking area code, list of PLMN identities for each of the cell listed in the cellsForWhichToReport field. |
| reportTriggering |
| A boolean flag that indicates whether the UE can trigger the measurement report based on the detection criterion as specified for autonomous detection of unknown neighbour cell detection criterion. This field can be configured only when the reportPurpose is set to cellOutsideSMTCWindowDetection or PCIConfusionDetection or cellOutsideSMTCWindowDetectionORPCIConfusionDetection. |
| includeMultiBandInfo |
| If this field is present, the UE shall acquire and include multi band information in the measurement report. |
| reportSSTD-Meas |
| If this field is set to true, the UE shall measure SSTD between the PCell and the PSCell as specified in TS 36.214 [48] and ignore the triggerQuantity, reportQuantity and maxReportCells fields. E-UTRAN only sets this field to true when setting triggerType to periodical and purpose to reportStrongestCells. |
| si-RequestForHO |
| The field applies to the reportCGI functionality, and when the field is included, the UE is allowed to use autonomous gaps in acquiring system information from the neighbour cell, applies a different value for T321, and includes different fields in the measurement report. |

| Conditional presence | Explanation |
|---|---|
| reportCGI | The field is optional, need OR, in case purpose is included and set to reportCGI; otherwise the field is not present and the UE shall delete any existing value for this field. |

2 SFTD Reporting Configurations

SFTD measurements are used to find the time difference between the two different cells of which one will be a PCell. In 3GPP, it has been agreed that the network can configure for NR SFTD measurements whenever a NR PSCell is configured, and, if no NR cell is configured as PSCell, then the network could request the UE to report SFTD measurements towards other NR cells also.

Figure 2:
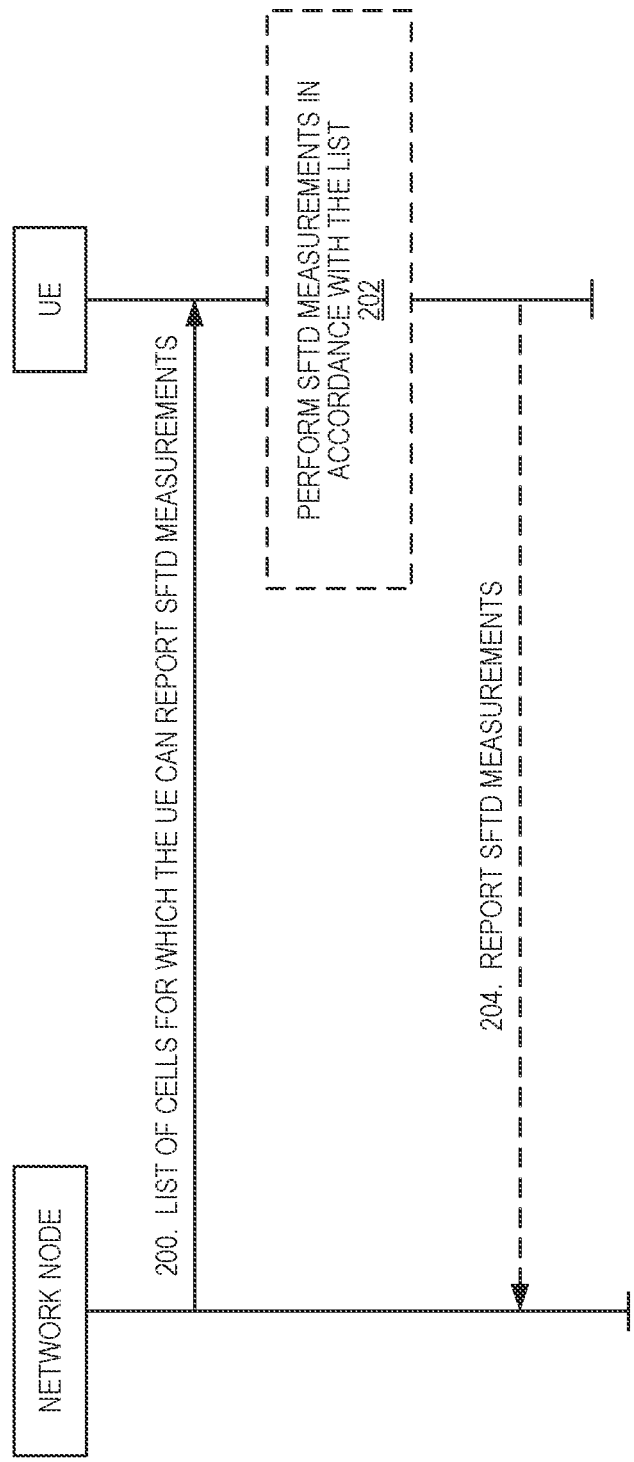
FIG. 2 illustrates a process in which a User Equipment (UE) is configured, by a network node, with a list of cells for which the UE can report Single Frequency Network (SFN)—Frame Time Difference (SFTD) measurements in accordance with some embodiments of the present disclosure.

Based on these agreements, the network could configure a list of cells for which the UE can report the SFTD measurements. One example of this is illustrated in FIG. 2. Optional steps are represented by dashed lines in FIG. 2. In particular, FIG. 2 illustrates a process in which a UE is configured, by a network node, with a list of cells for which the UE can report SFTD measurements in accordance with some embodiments of the present disclosure. As illustrated, the network node configures the UE with a list of cells for which the UE can report SFTD measurements (step 200). As described herein, in some embodiments, the list of cells is provided in an Information Element (e.g., the ReportConfigNR Information Element), which is transmitted in transmitted in an RRC message such as an RRC connection reconfiguration message or an RRC connection resume message, as will be appreciated by one of skill in the art upon reading this disclosure. The UE receives this list and optionally performs SFTD measurements in accordance with the list (step 202). In other words, the UE performs SFTD measurements for cells in the list. The UE reports the SFTD measurements for at least some of those cells to the network node (step 204).

In this disclosure, it is proposed to use a similar mechanism to configure the reporting configurations related to SFTD measurements to that of ANR related measurements. In the case of ANR related configurations, it was earlier proposed to provide a list of cells for which the UE is to report CGI measurements. It was also earlier proposed to configure this list in the reporting configuration rather than in measObject. A similar mechanism can be adopted for SFTD measurement related reporting configuration. Based on this, one example of SFTD reporting configuration is given below.

By configuring the UE with oneShotReport having reportPurpose set to reportSFTD, the UE will perform SFTD measurements. The reporting configuration can additionally include 'cellsForWhich ToReport' which indicates the UE as to for which cells the UE shall perform SFTD measurements and include in the measurement report.

| ReportConfigNR information element |
| --- |
| ```
-- ASN1START
-- TAG-REPORT-CONFIG-START
ReportConfigNR ::=          SEQUENCE {
    reportType              CHOICE {
        periodical              PeriodicalReportConfig,
        eventTriggered          EventTriggerConfig,
-- reportCGI is to be completed before the end of Rel-15.
        oneShotReport           OneShotReportConfig,
        ...
    }
}
OneShotReportConfig ::=     SEQUENCE {
    reportPurpose ENUMERATED {cellOutsideSMTCWindowDetection, PCIConfusionDetection,
cellOutsideSMTCWindowDetectionORPCIConfusionDetection, reportCGI, reportSFTD},
    -- Common reporting config (at least to periodical and eventTriggered)
    cellsForWhichToReport       CellIndexList           OPTIONAL, -- Need R
    reportTriggering            BOOLEAN                 OPTIONAL,
}
``` |

In some embodiments, the network can configure a threshold (instead of cellsForWhichToReport or as an additional parameter with cellsForWhichToReport) that indicates to the UE to include only those cells in the measurement report whose measured quality is within the configured threshold (i.e., satisfies the configured threshold for reporting).

In yet another embodiment, the SFTD measurements configured in LTE can be captured as given below. These various embodiments are shown as changes to 3GPP TS 36.331, with the amended text shown with highlighting, underlining, and bold text. Although specific names and terms for IEs are used in these proposals, it will be appreciated that these names and terms are used for illustrative purposes. Different names and terms may be adopted in the standard without deviating from the functionality disclosed herein.

$1^{st}$ Change 5.5 Measurements 5.5.1 Introduction

The UE reports measurement information in accordance with the measurement configuration as provided by E-UTRAN. E-UTRAN provides the measurement configuration applicable for a UE in RRC_CONNECTED by means of dedicated signaling, i.e. using the RRCConnectionReconfiguration or RRCConnectionResume message.

The UE can be requested to perform the following types of measurements:

Intra-frequency measurements: measurements at the downlink carrier frequency(ies) of the serving cell(s).

Inter-frequency measurements: measurements at frequencies that differ from any of the downlink carrier frequency(ies) of the serving cell(s).

Inter-RAT measurements of NR frequencies.

Inter-RAT measurements of UTRA frequencies.

Inter-RAT measurements of GERAN frequencies.

Inter-RAT measurements of CDMA2000 HRPD or CDMA2000 1×RTT or WLAN frequencies.

CBR measurements.

The measurement configuration includes the following parameters:

1. Measurement objects: The objects on which the UE shall perform the measurements.

For intra-frequency and inter-frequency measurements a measurement object is a single E-UTRA carrier frequency. Associated with this carrier frequency, E-UTRAN can configure a list of cell specific offsets, a list of 'blacklisted' cells and a list of 'whitelisted' cells. Blacklisted cells are not considered in event evaluation or measurement reporting.

For inter-RAT NR measurements a measurement object is a single NR carrier frequency. Associated with this carrier frequency, E-UTRAN can configure a list of 'blacklisted' cells. Blacklisted cells are not considered in event evaluation or measurement reporting.

For inter-RAT UTRA measurements a measurement object is a set of cells on a single UTRA carrier frequency.

For inter-RAT GERAN measurements a measurement object is a set of GERAN carrier frequencies.

For inter-RAT CDMA2000 measurements a measurement object is a set of cells on a single (HRPD or 1×RTT) carrier frequency.

For inter-RAT WLAN measurements a measurement object is a set of WLAN identifiers and optionally a set of WLAN frequencies.

For CBR measurements a measurement object is a set of transmission resource pools for V2X sidelink communication.

NOTE 1: Some measurements using the above mentioned measurement objects, only concern a single cell, e.g. measurements used to report neighbouring cell system information, PCell UE Rx-Tx time difference, or a pair of cells, e.g. SSTD measurements between the PCell and the PSCell, or SFTD measurements between the PCell and an NR cell.

2. Reporting configurations: A list of reporting configurations where each reporting configuration consists of the following:

Reporting criterion: The criterion that triggers the UE to send a measurement report. This can either be periodical or a single event description.

Reporting format: The quantities that the UE includes in the measurement report and associated information (e.g. number of cells to report).

$2^{nd}$ Change 5.5.3 Performing measurements 5.5.3.1 General

For all measurements, except for UE Rx-Tx time difference measurements, RSSI, UL PDCP Packet Delay per QCI measurement, channel occupancy measurements, CBR measurement, and except for WLAN measurements of Band, Carrier Info, Available Admission Capacity, Backhaul Bandwidth, Channel Utilization, and Station Count, the UE applies the layer 3 filtering as specified in 5.5.3.2, before using the measured results for evaluation of reporting criteria or for measurement reporting. When performing measurements on NR carriers, the UE derives the cell quality as specified in 5.5.3.3 and the beam quality as specified in 5.5.3.3a.

The UE shall:
1> whenever the UE has a measConfig, perform RSRP and RSRQ measurements for each serving cell as follows:
  2> for the PCell, apply the time domain measurement resource restriction in accordance with measSubframe PatternPCell, if configured;
  2> if the UE supports CRS based discovery signals measurement:
    3> for each SCell in deactivated state, apply the discovery signals measurement timing configuration in accordance with measDS-Config, if configured within the measObject corresponding to the frequency of the SCell;
1> if the UE has a measConfig with rs-sinr-Config configured, perform RS-SINR (as indicated in the associated reportConfig) measurements as follows:
  2> perform the corresponding measurements on the frequency indicated in the associated measObject using available idle periods or using autonomous gaps as necessary;
1> for each measId included in the measIdList within VarMeasConfig:
  2> if the purpose for the associated reportConfig is set to reportCGI:
    3> if si-RequestForHO is configured for the associated reportConfig:
      4> perform the corresponding measurements on the frequency and RAT indicated in the associated measObject using autonomous gaps as necessary;
    3> else:
      4> perform the corresponding measurements on the frequency and RAT indicated in the associated measObject using available idle periods or using autonomous gaps as necessary;
NOTE 1: If autonomous gaps are used to perform measurements, the UE is allowed to temporarily abort communication with all serving cell(s), i.e. create autonomous gaps to perform the corresponding measurements within the limits specified in TS 36.133 [16]. Otherwise, the UE only supports the measurements with the purpose set to reportCGI only if E-UTRAN has provided sufficient idle periods.
    3> try to acquire the global cell identity of the cell indicated by the cellForWhichToReportCGI in the associated measObject by acquiring the relevant system information from the concerned cell;
    3> if an entry in the cellAccessRelatedInfoList includes the selected PLMN, acquire the relevant system information from the concerned cell;
    3> if the cell indicated by the cellForWhichToReportCGI included in the associated measObject is an E-UTRAN cell:
      4> try to acquire the CSG identity, if the CSG identity is broadcast in the concerned cell;
      4> try to acquire the trackingAreaCode in the concerned cell;
      4> try to acquire the list of additional PLMN Identities, as included in the plmn-IdentityList, if multiple PLMN identities are broadcast in the concerned cell;
      4> if cellAccessRelatedInfoList is included, use trackingAreaCode and plmn-IdentityList from the entry of cellAccessRelatedInfoList containing the selected PLMN;
      4> if the include MultiBandInfo is configured:
        5> try to acquire the freqBandIndicator in the SystemInformationBlockType 1of the concerned cell;
        5> try to acquire the list of additional frequency band indicators, as included in the multiBandInfoList, if multiple frequency band indicators are included in the SystemInformation BlockType of the concerned cell;
        5> try to acquire the freqBandIndicatorPriority, if the freqBandIndicatorPriority is included in the SystemInformation BlockType1of the concerned cell;
NOTE 2: The 'primary' PLMN is part of the global cell identity.
    3> if the cell indicated by the cellForWhichToReportCGI included in the associated measObject is a UTRAN cell:
      4> try to acquire the LAC, the RAC and the list of additional PLMN Identities, if multiple PLMN identities are broadcast in the concerned cell;
      4> try to acquire the CSG identity, if the CSG identity is broadcast in the concerned cell;
    3> if the cell indicated by the cellForWhichToReportCGI included in the associated measObject is a GERAN cell:
      4> try to acquire the RAC in the concerned cell;
    3> if the cell indicated by the cellForWhichToReportCGI included in the associated measObject is a CDMA2000 cell and the cdma2000-Type included in the measObject is typeHRPD:
      4> try to acquire the Sector ID in the concerned cell;
    3> if the cell indicated by the cellForWhichToReportCGI included in the associated measObject is a CDMA2000 cell and the cdma2000-Type included in the measObject is type 1xRTT:
      4> try to acquire the BASE ID, SID and NID in the concerned cell;
  2> if the ul-DelayConfig is configured for the associated reportConfig:
    3> ignore the measObject;
    3> configure the PDCP layer to perform UL PDCP Packet Delay per QCI measurement;
  2> else:
    3> if a measurement gap configuration is setup; or
    3> if the UE does not require measurement gaps to perform the concerned measurements:
      4> if s-Measure is not configured; or
      4> if s-Measure is configured and the PCell RSRP, after layer 3 filtering, is lower than this value; or
      4> if the associated measObject concerns NR; or
      4> if measDS-Config is configured in the associated measObject:
        5> if the UE supports CSI-RS based discovery signals measurement; and
        5> if the eventId in the associated reportConfig is set to eventC1 or eventC2, or if reportStrongestCSI-RSs is included in the associated reportConfig:
          6> perform the corresponding measurements of CSI-RS resources on the frequency indicated in the concerned measObject, applying the discovery signals measurement timing configuration in accordance with measDS-Config in the concerned measObject:

6> if reportCRS-Meas is included in the associated reportConfig, perform the corresponding measurements of neighbouring cells on the frequencies indicated in the concerned measObject as follows:
7> for neighbouring cells on the primary frequency, apply the time domain measurement resource restriction in accordance with measSubframePatternConfigNeigh, if configured in the concerned measObject:
7> apply the discovery signals measurement timing configuration in accordance with measDS-Config in the concerned measObject:
5> else:
6> perform the corresponding measurements of neighbouring cells on the frequencies and RATs indicated in the concerned measObject as follows:
7> for neighbouring cells on the primary frequency, apply the time domain measurement resource restriction in accordance with measSubframePatternConfigNeigh, if configured in the concerned measObject:
7> if the UE supports CRS based discovery signals measurement, apply the discovery signals measurement timing configuration in accordance with measDS-Config, if configured in the concerned measObject:
4> if the ue-RxTxTimeDiffPeriodical is configured in the associated reportConfig:
5> perform the UE Rx-Tx time difference measurements on the PCell;
4> if the reportSSTD-Meas is set to true or pSCell in the associated reportConfig:
5> perform SSTD measurements between the PCell and the PSCell;
4> if the reportSFTD-Meas is set to pSCell in the associated reportConfig:
5> perform SFTD measurements between the PCell and the NR PSCell;
4> if the reportSFTD-Meas is set to neighborCells in the associated reportConfig:
5> perform SFTD measurements between the PCell and each of the detected NR neighbor cell;
4> if the measRSSI-ReportConfig is configured in the associated reportConfig:
5> perform the RSSI and channel occupancy measurements on the frequency indicated in the associated measObject;
2> perform the evaluation of reporting criteria as specified in 5.5.4;

The UE capable of CBR measurement when configured to transmit non-P2X related V2X sidelink communication shall:
1> if in coverage on the frequency used for V2X sidelink communication transmission as defined in TS 36.304 [4, 11.4]; or
1> if the concerned frequency is included in v2x-InterFreqInfoList in RRCConnectionReconfiguration or in v2x-InterFreqInfoList within SystemInformationBlockType21:
2> if the UE is in RRC_IDLE:
3> if the concerned frequency is the camped frequency:
4> perform CBR measurement on the pools in v2x-CommTxPoolNormalCommon and v2x-CommTxPoolExceptional if included in SystemInformationBlockType21;
3> else if v2x-CommTxPoolNormal or v2x-CommTxPoolExceptional is included in v2x-InterFreqInfoList for the concerned frequency within SystemInformationBlockType21:
4> perform CBR measurement on pools in v2x-CommTxPoolNormal and v2x-CommTxPoolExceptional in v2x-InterFreqInfoList for the concerned frequency in SystemInformationBlockType21;
3> else if the concerned frequency broadcasts SystemInformationBlockType21:
4> perform CBR measurement on pools in v2x-CommTxPoolNormalCommon and v2x-CommTxPoolExceptional if included in SystemInformationBlockType21 broadcast on the concerned frequency;
2> if the UE is in RRC_CONNECTED:
3> if tx-ResourcePoolToAddList is included in VarMeasConfig:
4> perform CBR measurements on each resource pool indicated in tx-ResourcePoolToAddList;
3> if the concerned frequency is the PCell's frequency:
4> perform CBR measurement on the pools in v2x-CommTxPoolNormalDedicated or v2x-SchedulingPool if included in RRCConnectionReconfiguration, v2x-CommTxPoolExceptional if included in SystemInformationBlockType21 for the concerned frequency and v2x-CommTxPoolExceptional if included in mobilityControlInfoV2X;
3> else if v2x-CommTxPoolNormal, v2x-SchedulingPool or v2x-CommTxPoolExceptional is included in v2x-InterFreqInfoList for the concerned frequency within RRCConnectionReconfiguration:
4> perform CBR measurement on pools in v2x-CommTxPoolNormal, v2x-SchedulingPool, and v2x-CommTxPoolExceptional if included in v2x-InterFreqInfoList for the concerned frequency in RRCConnectionReconfiguration;
3> else if the concerned frequency broadcasts SystemInformationBlockType21:
4> perform CBR measurement on pools in v2x-CommTxPoolNormalCommon and v2x-CommTxPoolExceptional if included in SystemInformationBlockType21 for the concerned frequency;
1> else:
2> perform CBR measurement on pools in v2x-CommTxPoolList in SL-V2X-Preconfiguration for the concerned frequency;

NOTE 3: The s-Measure defines when the UE is required to perform measurements. The UE is however allowed to perform measurements also when the PCell RSRP exceeds s-Measure, e.g., to measure cells broadcasting a CSG identity following use of the autonomous search function as defined in TS 36.304 [4].

NOTE 4: The UE may not perform the WLAN measurements it is configured with e.g. due to connection to another WLAN based on user preferences as specified in TS 23.402 or due to turning off WLAN.

3rd Change
Measurement Report Triggering
5.5.4.1 General
If security has been activated successfully, the UE shall:
1> for each measId included in the measIdList within VarMeasConfig:
  2> if the corresponding reportConfig includes a purpose set to reportStrongestCellsForSON:
    3> consider any neighbouring cell detected on the associated frequency to be applicable;
  2> else if the corresponding reportConfig includes a purpose set to reportCGI:
    3> consider any neighbouring cell detected on the associated frequency/set of frequencies (GERAN) which has a physical cell identity matching the value of the cellForWhichToReportCGI included in the corresponding measObject within the VarMeasConfig to be applicable;
  2> else if the corresponding reportConfig includes a purpose set to reportLocation:
    3> consider only the PCell to be applicable;
  2> else:
    3> if the corresponding measObject concerns E-UTRA:
      4> if the ue-RxTxTimeDiffPeriodical is configured in the corresponding reportConfig:
        5> consider only the PCell to be applicable;
      4> else if the reportSSTD-Meas is set to true in the corresponding reportConfig:
        5> consider the PSCell to be applicable;
      4> else if the eventA1 or eventA2 is configured in the corresponding reportConfig:
        5> consider only the serving cell to be applicable;
      4> else if eventC1 or eventC2 is configured in the corresponding reportConfig; or if reportStrongestCSI-RSs is included in the corresponding reportConfig:
        5> consider a CSI-RS resource on the associated frequency to be applicable when the concerned CSI-RS resource is included in the measCSI-RS-ToAddModList defined within the VarMeasConfig for this measId;
      4> else if measRSSI-ReportConfig is configured in the corresponding reportConfig:
        5> consider the resource indicated by the rmtc-Config on the associated frequency to be applicable;
      4> else if tx-ResourcePoolToAddList is configured in the measObject:
        5> consider the transmission resource pools indicated by the tx-ResourcePoolToAddList defined within the VarMeasConfig for this measId to be applicable;
      4> else:
        5> if use WhiteCellList is set to TRUE:
          6> consider any neighbouring cell detected on the associated frequency to be applicable when the concerned cell is included in the whiteCellsToAddModList defined within the VarMeasConfig for this measId:
        5> else:
          6> consider any neighbouring cell detected on the associated frequency to be applicable when the concerned cell is not included in the blackCellsToAddModList defined within the VarMeasConfig for this measId:
        5> for events involving a serving cell on one frequency and neighbours on another frequency, consider the serving cell on the other frequency as a neighbouring cell;
      4> if the corresponding reportConfig includes alternativeTimeToTrigger and if the UE supports alternativeTimeToTrigger:
        5> use the value of alternativeTimeToTrigger as the time to trigger instead of the value of timeToTrigger in the corresponding reportConfig for cells included in the altTTT-CellsToAddModList of the corresponding measObject;
    3> else if the corresponding measObject concerns UTRA or CDMA2000:
      4> consider a neighbouring cell on the associated frequency to be applicable when the concerned cell is included in the cellsToAddModList defined within the VarMeasConfig for this measId (i.e. the cell is included in the whitelist);
NOTE 0: The UE may also consider a neighbouring cell on the associated UTRA frequency to be applicable when the concerned cell is included in the csg-allowedReportingCells within the VarMeasConfig for this measId, if configured in the corresponding measObjectUTRA (i.e. the cell is included in the range of physical cell identities for which reporting is allowed).
    3> else if the corresponding measObject concerns GERAN:
      4> consider a neighbouring cell on the associated set of frequencies to be applicable when the concerned cell matches the ncc-Permitted defined within the VarMeasConfig for this measId;
    3> else if the corresponding measObject concerns WLAN:
      4> consider a WLAN on the associated set of frequencies, as indicated by carrierFreq or on all WLAN frequencies when carrierFreq is not present, to be applicable if the WLAN matches all WLAN identifiers of at least one entry within wlan-Id-List for this measId;
    3> else if the corresponding measObject concerns NR:
      4> if the reportSFTD-Meas is set to pSCell in the corresponding reportConfig:
        5> consider the PSCell to be applicable;
      4> else if the reportSFTD-Meas is set to neighborCells, in the corresponding reportConfig and no NR PSCell is configured:
        5> consider any neighbouring NR cell detected on the associated frequency to be applicable;
  2> if the triggerType is set to event and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include a measurement reporting entry for this measId (a first cell triggers the event):
    3> include a measurement reporting entry within the VarMeasReportList for this measId;
    3> set the numberOfReportsSent defined within the VarMeasReportList for this measId to 0;

3> include the concerned cell(s) in the cellsTriggeredList defined within the VarMeasReportList for this measId;
3> if the UE supports T312 and if useT312 is included for this event and if T310 is running:
 4> if T312 is not running:
  5> start timer T312 with the value configured in the corresponding measObject;
3> initiate the measurement reporting procedure, as specified in 5.5.5;
2> if the triggerType is set to event and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
 3> set the numberOfReportsSent defined within the VarMeasReportList for this measId to 0;
 3> include the concerned cell(s) in the cellsTriggeredList defined within the VarMeasReportList for this measId;
 3> if the UE supports T312 and if useT312 is included for this event and if T310 is running:
  4> if T312 is not running:
   5> start timer T312 with the value configured in the corresponding measObject;
 3> initiate the measurement reporting procedure, as specified in 5.5.5;
2> if the triggerType is set to event and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:
 3> remove the concerned cell(s) in the cellsTriggeredList defined within the VarMeasReportList for this measId;
 3> if the UE supports T312 and if useT312 is included for this event and if T310 is running:
  4> if T312 is not running:
   5> start timer T312 with the value configured in the corresponding measObject;
 3> if reportOnLeave is set to TRUE for the corresponding reporting configuration or if a6-ReportOnLeave is set to TRUE for the corresponding reporting configuration:
  4> initiate the measurement reporting procedure, as specified in 5.5.5;
 3> if the cellsTriggeredList defined within the VarMeasReportList for this measId is empty:
  4> remove the measurement reporting entry within the VarMeasReportList for this measId;
  4> stop the periodical reporting timer for this measId, if running;
2> if the triggerType is set to event and if the entry condition applicable for this event, i.e. the event corresponding with the eventId of the corresponding reportConfig within VarMeasConfig, is fulfilled for one or more applicable CSI-RS resources for all measurements after layer 3 filtering taken during timeToTrigger defined for this event within the VarMeasConfig, while the VarMeasReportList does not include an measurement reporting entry for this measId (i.e. a first CSI-RS resource triggers the event):
 3> include a measurement reporting entry within the VarMeasReportList for this measId;
 3> set the numberOfReportsSent defined within the VarMeasReportList for this measId to 0;
 3> include the concerned CSI-RS resource(s) in the csi-RS-TriggeredList defined within the VarMeasReportList for this measId;
 3> initiate the measurement reporting procedure, as specified in 5.5.5;
2> if the triggerType is set to event and if the entry condition applicable for this event, i.e. the event corresponding with the eventId of the corresponding reportConfig within VarMeasConfig, is fulfilled for one or more applicable CSI-RS resources not included in the csi-RS-TriggeredList for all measurements after layer 3 filtering taken during timeToTrigger defined for this event within the VarMeasConfig (i.e. a subsequent CSI-RS resource triggers the event):
 3> set the numberOfReportsSent defined within the VarMeasReportList for this measId to 0;
 3> include the concerned CSI-RS resource(s) in the csi-RS-TriggeredList defined within the VarMeasReportList for this measId;
 3> initiate the measurement reporting procedure, as specified in 5.5.5;
2> if the triggerType is set to event and if the leaving condition applicable for this event is fulfilled for one or more of the CSI-RS resources included in the csi-RS-TriggeredList defined within the VarMeasReportList for this measId for all measurements after layer 3 filtering taken during timeToTrigger defined within the VarMeasConfig for this event:
 3> remove the concerned CSI-RS resource(s) in the csi-RS-TriggeredList defined within the VarMeasReportList for this measId;
 3> if c1-ReportOnLeave is set to TRUE for the corresponding reporting configuration or if c2-ReportOnLeave is set to TRUE for the corresponding reporting configuration:
  4> initiate the measurement reporting procedure, as specified in 5.5.5;
 3> if the csi-RS-TriggeredList defined within the VarMeasReportList for this measId is empty:
  4> remove the measurement reporting entry within the VarMeasReportList for this measId;
  4> stop the periodical reporting timer for this measId, if running;
2> if the triggerType is set to event and if the entry condition applicable for this event, i.e. the event corresponding with the eventId of the corresponding reportConfig within VarMeasConfig, is fulfilled for one or more applicable transmission resource pools for all measurements taken during timeToTrigger defined for this event within the VarMeasConfig, while the VarMeasReportList does not include an measurement reporting entry for this measId (a first transmission resource pool triggers the event):
 3> include a measurement reporting entry within the VarMeasReportList for this measId;
 3> set the numberOfReportsSent defined within the VarMeasReportList for this measId to 0;
 3> include the concerned transmission resource pool(s) in the poolsTriggeredList defined within the VarMeasReportList for this measId;

3> initiate the measurement reporting procedure, as specified in 5.5.5;

2> if the triggerType is set to event and if the entry condition applicable for this event, i.e. the event corresponding with the eventId of the corresponding reportConfig within VarMeasConfig, is fulfilled for one or more applicable transmission resource pools not included in the poolsTriggeredList for all measurements taken during timeToTrigger defined for this event within the VarMeasConfig (a subsequent transmission resource pool triggers the event):

3> set the numberOfReportsSent defined within the VarMeasReportList for this measId to 0;

3> include the concerned transmission resource pool(s) in the poolsTriggeredList defined within the VarMeasReportList for this measId;

3> initiate the measurement reporting procedure, as specified in 5.5.5;

2> if the triggerType is set to event and if the leaving condition applicable for this event is fulfilled for one or more applicable transmission resource pools included in the poolsTriggeredList defined within the VarMeasReportList for this measId for all measurements taken during timeToTrigger defined within the VarMeasConfig for this event:

3> remove the concerned transmission resource pool(s) from the poolsTriggeredList defined within the VarMeasReportList for this measId;

3> if the poolsTriggeredList defined within the VarMeasReportList for this measId is empty:

4> remove the measurement reporting entry within the VarMeasReportList for this measId;

4> stop the periodical reporting timer for this measId, if running;

2> if measRSSI-ReportConfig is included and if a (first) measurement result is available:

3> include a measurement reporting entry within the VarMeasReportList for this measId;

3> set the numberOfReportsSent defined within the VarMeasReportList for this measId to 0;

3> initiate the measurement reporting procedure as specified in 5.5.5 immediately when RSSI sample values are reported by the physical layer after the first L1 measurement duration;

2> else if the purpose is included and set to reportStrongestCells, reportStrongestCellsForSON, reportLocation or sidelink and if a (first) measurement result is available:

3> include a measurement reporting entry within the VarMeasReportList for this measId;

3> set the numberOfReportsSent defined within the VarMeasReportList for this measId to 0;

3> if the purpose is set to reportStrongestCells and reportStrongestCSI-RSs is not included:

4> if the triggerType is set to periodical and the corresponding reportConfig includes the ul-DelayConfig:

5> initiate the measurement reporting procedure, as specified in 5.5.5, immediately after a first measurement result is provided by lower layers;

4> else if the corresponding measurement object concerns WLAN:

5> initiate the measurement reporting procedure, as specified in 5.5.5, immediately after the quantity to be reported becomes available for the PCell and for the applicable WLAN(s);

4> else if the reportAmount exceeds 1:

5> initiate the measurement reporting procedure, as specified in 5.5.5, immediately after the quantity to be reported becomes available for the PCell;

4> else (i.e. the reportAmount is equal to 1):

5> initiate the measurement reporting procedure, as specified in 5.5.5, immediately after the quantity to be reported becomes available for the PCell and for the strongest cell among the applicable cells, or becomes available for the pair of PCell and the PSCell in case of SSTD measurements, or becomes available for each of the pair of PCell and an NR cell in case of SFTD measurements;

3> else if the purpose is set to reportLocation:

4> initiate the measurement reporting procedure, as specified in 5.5.5, immediately after both the quantity to be reported for the PCell and the location information become available;

3> else if the purpose is set to sidelink:

4> initiate the measurement reporting procedure as specified in 5.5.5 immediately after both the quantity to be reported for the PCell and the CBR measurement result become available;

3> else:

4> initiate the measurement reporting procedure, as specified in 5.5.5, when it has determined the strongest cells on the associated frequency;

2> upon expiry of the periodical reporting timer for this measId:

3> initiate the measurement reporting procedure, as specified in 5.5.5;

2> if the purpose is included and set to reportCGI and if the UE acquired the information needed to set all fields of cgi-Info for the requested cell:

3> include a measurement reporting entry within the VarMeasReportList for this measId;

3> set the numberOfReportsSent defined within the VarMeasReportList for this measId to 0;

3> stop timer T321;

3> initiate the measurement reporting procedure, as specified in 5.5.5;

2> upon expiry of the T321 for this measId:

3> include a measurement reporting entry within the VarMeasReportList for this measId;

3> set the numberOfReportsSent defined within the VarMeasReportList for this measId to 0;

3> initiate the measurement reporting procedure, as specified in 5.5.5;

NOTE 2: The UE does not stop the periodical reporting with triggerType set to event or to periodical while the corresponding measurement is not performed due to the PCell RSRP being equal to or better than s-Measure or due to the measurement gap not being setup.

NOTE 3: If the UE is configured with DRX, the UE may delay the measurement reporting for event triggered and periodical triggered measurements until the Active Time, which is defined in TS 36.321 [6].

$4^{th}$ Change 5.5.5 Measurement Reporting

The purpose of this procedure is to transfer measurement results from the UE to E-UTRAN. The UE shall initiate this procedure only after successful security activation.

For the measId for which the measurement reporting procedure was triggered, the UE shall set the measResults within the MeasurementReport message as follows:

1> set the measId to the measurement identity that triggered the measurement reporting;
1> set the measResultPCell to include the quantities of the PCell;
1> set the measResultServFreqList to include for each E-UTRA SCell that is configured, if any, within measResultSCell the quantities of the concerned SCell, if available according to performance requirements in [16], except if purpose for the reportConfig associated with the measId that triggered the measurement reporting is set to reportLocation;
1> if the reportConfig associated with the measId that triggered the measurement reporting includes reportAddNeighMeas:
  2> for each E-UTRA serving frequency for which measObjectId is referenced in the measIdList, other than the frequency corresponding with the measId that triggered the measurement reporting:
    3> set the measResultServFreqList to include within measResultBestNeighCell the physCellId and the quantities of the best non-serving cell, based on RSRP, on the concerned serving frequency;
1> if the triggerType is set to event; and if the corresponding measObject concerns NR; and if eventId is set to eventB1 or eventB2; or
1> if the triggerType is set to event; and if eventId is set to eventA3 or eventA4 or eventA5:
  2> if purpose for the reportConfig associated with the measId that triggered the measurement reporting is set to a value other than reportLocation:
    3> set the measResultServFreqListNR to include for each NR serving frequency, if any, the following:
      4> set measResultSCell to include the available results of the NR serving cell, if meeting performance requirements in [16];
      4> if the reportConfig associated with the measId that triggered the measurement reporting includes reportAddNeighMeas:
        5> set measResultBestNeighCell to include the available results of the best non-serving cell, based on RSRP;
        5> for each (serving or neighbouring) cell for which the UE reports results according to the previous, additionally include available beam results according to the following:
          6> if maxRS-IndexReport is configured, set measResultCellRS-Index to include results of up to maxRS-IndexReport beams whose quantity is above threshRS-Index defined in the VarMeasConfig for the corresponding measObject and in order of decreasing quantity, same as used for cell reporting, and as follows:
            7> select and order beams based on the reporting quantity determined as specified in 5.5.5.2; TBC Ordering for beams based on NR principles as reflected in TPR2-1801646:
            7> include ssbIndex:
            7> if reportQuantityRS-IndexNR and reportRS-IndexResultsNR are configured, for each quantity indicated, include the corresponding measurement result:
            TBC Whether to introduce a similar bit as in NR e.g. add if reportQuantityRS-IndexNR and reportRS-IndexResults are configured
          TBC Reporting of available results based on NR principles as reflected in TPR2-1800951:

1> if there is at least one applicable neighbouring cell to report:
  2> set the measResultNeighCells to include the best neighbouring cells up to maxReportCells in accordance with the following:
    3> if the triggerType is set to event:
      4> include the cells included in the cellsTriggeredList as defined within the VarMeasReportList for this measId:
    3> else:
      4> include the applicable cells for which the new measurement results became available since the last periodical reporting or since the measurement was initiated or reset;
NOTE 1: The reliability of the report (i.e. the certainty it contains the strongest cells on the concerned frequency) depends on the measurement configuration i.e. the reportInterval. The related performance requirements are specified in TS 36.133 [16].
    3> for each cell that is included in the measResultNeighCells, include the physCellId;
    3> if the triggerType is set to event; or the purpose is set to reportStrongestCells or to reportStrongestCellsForSON:
      4> for each included cell, include the layer 3 filtered measured results in accordance with the reportConfig for this measId, ordered as follows:
        5> if the measObject associated with this measId concerns E-UTRA:
          6> set the measResult to include the quantity(ies) indicated in the reportQuantity within the concerned reportConfig in order of decreasing triggerQuantity, i.e. the best cell is included first:
        5> if the measObject associated with this measId concerns NR:
          6> set the measResultCell to include the quantity(ies) indicated in the reportQuantityCellNR within the concerned reportConfig in order of decreasing quantity according to bN-ThresholdYNR, i.e. the best cell is included first;
          6> if maxRS-IndexReport is configured, set measResultCellRS-Index to include results of up to maxRS-IndexReport beams whose quantity is above threshRS-Index defined in the VarMeasConfig for the corresponding measObject and in order of decreasing quantity, same as used for cell reporting, and as follows:
            7> select and order beams based on the reporting quantity determined as specified in 5.5.5.2: TBC Ordering for beams based on NR principles as reflected in TPR2-1801646:
            7> include ssbIndex:
            7> if reportQuantityRS-IndexNR and reportRS-IndexResultsNR are configured, for each quantity indicated, include the corresponding measurement result:
            TBC Whether to introduce a similar bit as in NR e.g. add if reportQuantityRS-IndexNR and reportRS-IndexResults are configured
        5> if the measObject associated with this measId concerns UTRA FDD and if ReportConfigInterRAT includes the reportQuantityUTRA-FDD:
          6> set the measResult to include the quantities indicated by the reportQuantityUTRA-FDD in order of decreasing measQuantityUTRA-FDD within the quantityConfig, i.e. the best cell is included first:
5> if the measObject associated with this measId concerns UTRA FDD and if ReportConfigInterRAT does not include the reportQuantityUTRA-FDD; or
5> if the measObject associated with this measId concerns UTRA TDD, GERAN or CDMA2000:
6> set the measResult to the quantity as configured for the concerned RAT within the quantityConfig in order of either decreasing quantity for UTRA and GERAN or increasing quantity for CDMA2000 pilotStrength, i.e. the best cell is included first;
3> else if the purpose is set to reportCGI:
4> if the mandatory present fields of the cgi-Info for the cell indicated by the cellForWhichToReportCGI in the associated measObject have been obtained:
5> if the includeMultiBandInfo is configured:
6> include the freqBandIndicator;
6> if the cell broadcasts the multiBandInfoList, include the multiBandInfoList;
6> if the cell broadcasts the freqBandIndicatorPriority, include the freqBandIndicatorPriority;
5> if the cell broadcasts a CSG identity:
6> include the csg-Identity;
6> include the csg-MemberStatus and set it to member if the cell is a CSG member cell;
5> if the si-RequestForHO is configured within the reportConfig associated with this measId:
6> include the cgi-Info containing all the fields other than the plmn-IdentityList that have been successfully acquired;
6> include, within the cgi-Info, the field plmn-IdentityList in accordance with the following:
7> if the cell is a CSG member cell, determine the subset of the PLMN identities, starting from the second entry of PLMN identities in the broadcast information, that meet the following conditions:
a) equal to the RPLMN or an EPLMN; and
b) the CSG whitelist of the UE includes an entry comprising of the concerned PLMN identity and the CSG identity broadcast by the cell;
7> if the subset of PLMN identities determined according to the previous includes at least one PLMN identity, include the plmn-IdentityList and set it to include this subset of the PLMN identities;
7> if the cell is a CSG member cell, include the primaryPLMN-Suitable if the primary PLMN meets conditions a) and b) specified above;
5> else:
6> include the cgi-Info containing all the fields that have been successfully acquired and in accordance with the following:
7> include in the plmn-IdentityList the list of identities starting from the second entry of PLMN Identities in the broadcast information;
1> for the cells included according to the previous (i.e. covering the PCell, the SCells, the best non-serving cells on serving frequencies as well as neighbouring EUTRA cells) include results according to the extended RSRQ if corresponding results are available according to the associated performance requirements defined in 36.133 [16];
1> if there is at least one applicable CSI-RS resource to report:
2> set the measResultCSI-RS-List to include the best CSI-RS resources up to maxReportCells in accordance with the following:
3> if the triggerType is set to event:
4> include the CSI-RS resources included in the csi-RS-TriggeredList as defined within the VarMeasReportList for this measId:
3> else:
4> include the applicable CSI-RS resources for which the new measurement results became available since the last periodical reporting or since the measurement was initiated or reset;
NOTE 2: The reliability of the report (i.e. the certainty it contains the strongest CSI-RS resources on the concerned frequency) depends on the measurement configuration i.e. the reportInterval. The related performance requirements are specified in TS 36.133 [16].
3> for each CSI-RS resource that is included in the measResultCSI-RS-List:
4> include the measCSI-RS-Id;
4> include the layer 3 filtered measured results in accordance with the reportConfig for this measId, ordered as follow:
5> set the csi-RSRP-Result to include the quantity indicated in the reportQuantity within the concerned reportConfig in order of decreasing triggerQuantityCSI-RS, i.e. the best CSI-RS resource is included first;
4> if reportCRS-Meas is included within the associated reportConfig, and the cell indicated by physCellId of this CSI-RS resource is not a serving cell:
5> set the measResultNeighCells to include the cell indicated by physCellId of this CSI-RS resource, and include the physCellId;
5> set the rsrpResult to include the RSRP of the concerned cell, if available according to performance requirements in [16];
5> set the rsrqResult to include the RSRQ of the concerned cell, if available according to performance requirements in [16];
1> if the ue-RxTxTimeDiffPeriodical is configured within the corresponding reportConfig for this measId;
2> set the ue-RxTxTimeDiffResult to the measurement result provided by lower layers;
2> set the currentSFN;
1> if the measRSSI-ReportConfig is configured within the corresponding reportConfig for this measId:
2> set the rssi-Result to the average of sample value(s) provided by lower layers in the reportInterval;
2> set the channelOccupancy to the rounded percentage of sample values which are beyond to the channelOccupancyThreshold within all the sample values in the reportInterval;
1> if uplink PDCP delay results are available:
2> set the ul-PDCP-DelayResultList to include the uplink PDCP delay results available;
1> if the include LocationInfo is configured in the corresponding reportConfig for this measId or if purpose for the reportConfig associated with the measId that triggered the measurement reporting is set to reportLocation; and detailed location information that has not been reported is available, set the content of the locationInfo as follows:
2> include the locationCoordinates;
2> if available, include the gnss-TOD-msec, except if purpose for the reportConfig associated with the measId that triggered the measurement reporting is set to reportLocation;
1> if the reportSSTD-Meas is set to true or pSCell within the corresponding reportConfig for this measId:
2> set the measResultSSTD to the measurement results provided by lower layers;
1> if the reportSFTD-Meas is set to neighborCells or pSCell within the corresponding reportConfigInterRAT for this measId:
2> set the measResultSFTD to the measurement results provided by lower layers;

$5^{th}$ Change 6.3.5 Measurement Information Elements
<Omitted Text>
MeasResults
The IE MeasResults covers measured results for intra-frequency, inter-frequency and inter-RAT mobility.

| MeasResults information element |
|---|

```
-- ASN1START
MeasResults ::=                       SEQUENCE {
  measId                              MeasId,
  measResultPCell                     SEQUENCE {
    rsrpResult                          RSRP-Range,
    rsrqResult                          RSRQ-Range
  },
  measResultNeighCells                CHOICE{
    measResultListEUTRA                 MeasResultListEUTRA,
    measResultListUTRA                  MeasResultListUTRA,
    measResultListGERAN                 MeasResultListGERAN,
    measResultsCDMA2000                 MeasResultsCDMA2000,
    ...,
    measResultNeighCellListNR-r15       MeasResultCellListNR-r15
  }                                                                             OPTIONAL,
  ...,
  [[ measResultForECID-r9              MeasResultForECID-r9                     OPTIONAL
  ]],
  [[ locationInfo-r10                  LocationInfo-r10                         OPTIONAL,
     measResultServFreqList-r10        MeasResultServFreqList-r10               OPTIONAL
  ]],
  [[ measId-v1250                      MeasId-v1250                             OPTIONAL,
     measResultPCell-v1250             RSRQ-Range-v1250                         OPTIONAL,
     measResultCSI-RS-List-r12         MeasResultCSI-RS-List-r12                OPTIONAL
  ]],
  [[ measResultForRSSI-r13             MeasResultForRSSI-r13                    OPTIONAL,
     measResultServFreqListExt-r13     MeasResultServFreqListExt-r13            OPTIONAL,
     measResultSSTD-r13                MeasResultSSTD-r13                       OPTIONAL,
     measResultPCell-v1310             SEQUENCE {
       rs-sinr-Result-r13                RS-SINR-Range-r13
     }                                                                          OPTIONAL,
     ul-PDCP-DelayResultList-r13       UL-PDCP-DelayResultList-r13              OPTIONAL,
     measResultListWLAN-r13            MeasResultListWLAN-r13                   OPTIONAL
  ]],
  [[ measResultPCell-v1360             RSRP-Range-v1360                         OPTIONAL
  ]],
  [[ measResultListCBR-r14             MeasResultListCBR-r14                    OPTIONAL,
     measResultListWLAN-r14            MeasResultListWLAN-r14                   OPTIONAL
  ]],
  [[ measResultServFreqListNR-r15      MeasResultServFreqListNR-r15             OPTIONAL
  ]]
}
MeasResultListEUTRA ::=               SEQUENCE (SIZE (1..maxCellReport)) OF MeasResultEUTRA
MeasResultEUTRA ::= SEQUENCE {
  physCellId                          PhysCellId,
  cgi-Info                            SEQUENCE {
    cellGlobalId                        CellGlobalIdEUTRA,
    trackingAreaCode                    TrackingAreaCode,
    plmn-IdentityList                   PLMN-IdentityList2                      OPTIONAL
  }                                                                             OPTIONAL,
  measResult                          SEQUENCE {
    rsrpResult                          RSRP-Range                              OPTIONAL,
    rsrqResult                          RSRQ-Range                              OPTIONAL,
    ...
    [[ additionalSI-Info-r9             AdditionalSI-Info-r9                    OPTIONAL
    ]],
    [[ primaryPLMN-Suitable-r12         ENUMERATED {true}                       OPTIONAL,
       measResult-v1250                 RSRQ-Range-v1250                        OPTIONAL
    ]],
    [[ rs-sinr-Result-r13               RS-SINR-Range-r13                       OPTIONAL,
       cgi-Info-v1310                   SEQUENCE {
         freqBandIndicator-r13            FreqBandIndicator-r11                 OPTIONAL,
         multiBandInfoList-r13            MultiBandInfoList-r11                 OPTIONAL,
```

-continued

| MeasResults information element | | |
|---|---|---|
|       freqBandIndicatorPriority-r13 | ENUMERATED {true} | OPTIONAL |
|     } | | OPTIONAL |
|   ]], | | |
|   [[ | | |
|     measResult-v1360 | RSRP-Range-v1360 | OPTIONAL |
|   ]] | | |
|   } | | |
| } | | |
| MeasResultServFreqListNR-r15 ::= | SEQUENCE (SIZE (1. .maxServCell-r13)) OF MeasResultServFreqNR-r15 | |
| MeasResultServFreqNR-r15 ::= | SEQUENCE { | |
|   carrierFreq-r15 | GSCN-ValueNR-r15, | |
|   measResultSCell-r15 | MeasResultCellNR-r15 | OPTIONAL, |
|   measResultBestNeighCell-r15 | MeasResultCellNR-r15 | OPTIONAL, |
|   ... | | |
| } | | |
| MeasResultCellListNR-r15 ::= SEQUENCE (SIZE (1. .maxCellReport)) OF MeasResultCellNR-r15 | | |
| MeasResultCellNR-r15 ::= | SEQUENCE { | |
|   pci-r15 | PhysCellIdNR-r15, | |
|   measResultCell-r15 | MeasResultNR-r15, | |
|   measResultRS-IndexList-r15 | MeasResultSSB-IndexList-r15 | OPTIONAL, |
|   ... | | |
| } | | |
| MeasResultNR-r15 ::= | SEQUENCE { | |
|   rsrpResult-r15 | RSRP-RangeNR-r15 | OPTIONAL, |
|   rsrqResult-r15 | RSRQ-RangeNR-r15 | OPTIONAL, |
|   rs-sinr-Result-r15 | RS-SINR-RangeNR-r15 | OPTIONAL, |
|   measResultSFTD-r15 | MeasResultSFTD-r15 | OPTIONAL |
|   ... | | |
| } | | |
| MeasResultSSB-IndexList-r15: ::= SEQUENCE (SIZE (1. .maxRS-Index-r15)) OF MeasResultSSB-Index-r15 | | |
| MeasResultSSB-Index-r15: ::= | SEQUENCE { | |
|   ssb-Index-r15 | RS-IndexNR-r15, | |
|   measResultSSB-Index-r15 | MeasResultNR-r15 | OPTIONAL, |
|   ... | | |
| } | | |
| MeasResultServFreqList-r10: ::= SEQUENCE (SIZE (1. .maxServCell-r10)) OF MeasResultServFreq-r10 | | |
| MeasResultServFreqListExt-r13 : ::= SEQUENCE (SIZE (1. .maxServCell-r13)) OF MeasResultServFreq-r13 | | |
| MeasResultServFreq-r10 ::= | SEQUENCE { | |
|   servFreqId-r10 | ServCellIndex-r10, | |
|   measResultSCell-r10 | SEQUENCE { | |
|     rsrpResultSCell-r10 | RSRP-Range, | |
|     rsrqResultSCell-r10 | RSRQ-Range | |
|   } | | OPTIONAL, |
|   measResultBestNeighCell-r10 | SEQUENCE { | |
|     physCellId-r10 | PhysCellId, | |
|     rsrpResultNCell-r10 | RSRP-Range, | |
|     rsrqResultNCell-r10 | RSRQ-Range | |
|   } | | OPTIONAL, |
|   ... | | |
|   [[ measResultSCell-v1250 | RSRQ-Range-v1250 | OPTIONAL, |
|     measResultBestNeighCell-v1250 | RSRQ-Range-v1250 | OPTIONAL |
|   ]], | | |
|   [[ measResultSCell-v1310 | SEQUENCE { | |
|     rs-sinr-Result-r13 | RS-SINR-Range-r13 | |
|   }   OPTIONAL, | | |
|     measResultBestNeighCell-v1310 | SEQUENCE { | |
|     rs-sinr-Result-r13 | RS-SINR-Range-r13 | |
|   }   OPTIONAL | | |
|   ]] | | |
| } | | |
| MeasResultServFreq-r13 ::= | SEQUENCE { | |
|   servFreqId-r13 | ServCellIndex-r13, | |
|   measResultSCell-r13 | SEQUENCE { | |
|     rsrpResultSCell-r13 | RSRP-Range, | |
|     rsrqResultSCell-r13 | RSRQ-Range-r13, | |
|     rs-sinr-Result-r13 | RS-SINR-Range-r13 | OPTIONAL |
|   } | | OPTIONAL, |
|   measResultBestNeighCell-r13 | SEQUENCE { | |
|     physCellId-r13 | PhysCellId, | |
|     rsrpResultNCell-r13 | RSRP-Range, | |
|     rsrqResultNCell-r13 | RSRQ-Range-r13, | |
|     rs-sinr-Result-r13 | RS-SINR-Range-r13 | OPTIONAL |
|   } | | OPTIONAL, |
|   ..., | | |
|   [[ measResultBestNeighCell-v1360 | SEQUENCE { | |
|     rsrpResultNCell-v1360 | RSRP-Range-v1360 | |
|   } | | OPTIONAL |

| MeasResults information element |
|---|

```
    ]]
}
MeasResultCSI-RS-List-r12 : := SEQUENCE (SIZE (1. .maxCellReport)) OF MeasResultCSI-RS-r12
MeasResultCSI-RS-r12: :=            SEQUENCE {
    measCSI-RS-Id-r12                   MeasCSI-RS-Id-r12,
    csi-RSRP-Result-r12                 CSI-RSRP-Range-r12,
    ...
}
MeasResultListUTRA : :=             SEQUENCE (SIZE (1. .maxCellReport)) OF MeasResultUTRA
MeasResultUTRA : := SEQUENCE {
    physCellId                          CHOICE {
        fdd                                 PhysCellIdUTRA-FDD,
        tdd                                 PhysCellIdUTRA-TDD
    },
    cgi-Info                            SEQUENCE {
        cellGlobalId                        CellGlobalIdUTRA,
        locationAreaCode                    BIT STRING (SIZE (16))                  OPTIONAL,
        routingAreaCode                     BIT STRING (SIZE (8))                   OPTIONAL,
        plmn-IdentityLEst                   PLMN-IdentityList2                      OPTIONAL
    }                                                                           OPTIONAL,
    measResult                          SEQUENCE {
        utra-RSCP                           INTEGER (−5. .91)                       OPTIONAL,
        utra-EcN0                           INTEGER (0. .49)                        OPTIONAL,
        ...,
        [[ additionalSI-Info-r9             AdditionalSI-Info-r9                    OPTIONAL
        ]],
        [[ primaryPLMN-Suitable-r12         ENUMERATED{true}                        OPTIONAL
        ]]
    }
}
MeasResultListGERAN : :=            SEQUENCE (SIZE (1. .maxCellReport)) OF MeasResultGERAN
MeasResultGERAN : := SEQUENCE {
    carrierFreq                         CarrierFreqGERAN,
    physCellId                          PhysCellIdGERAN,
    cgi-Info                            SEQUENCE {
        cellGlobalId                        CellGlobalIdGERAN,
        routingAreaCode                     BIT STRING (SIZE (8))                   OPTIONAL
    }                                   OPTIONAL,
    measResult                          SEQUENCE {
        rssi                                INTEGER (0. .63),
        ...
    }
}
MeasResultsCDMA2000 : :=             SEQUENCE{
    preRegistrationStatusHRPD           BOOLEAN,
    measResultListCDMA2000              MeasResultListCDMA2000
}
MeasResultListCDMA2000 : :=         SEQUENCE (SIZE (1. .maxCellReport)) OF MeasResultCDMA2000
MeasResultCDMA2000 : := SEQUENCE {
    physCellId                          PhysCellIdCDMA2000,
    cgi-Info                            CellGlobalIdCDMA2000                        OPTIONAL,
    measResult                          SEQUENCE {
        pilotPnPhase                        INTEGER (0. .32767)                     OPTIONAL,
        pilotStrength                       INTEGER (0. .63),
        ...
    }
}
MeasResultListWLAN-r13 : :=         SEQUENCE (SIZE (1. .maxCellReport)) OF MeasResultWLAN-r13
MeasResultListWLAN-r14 : :=         SEQUENCE (SIZE (1. .maxWLAN-Id-Report-r14)) OF MeasResultWLAN-r13
MeasResultWLAN-r13: := SEQUENCE {
    wlan-Identifiers-r13                    WLAN-Identifiers-r12,
    carrierInfoWLAN-r13                     WLAN-CarrierInfo-r13        OPTIONAL,
    bandWLAN-r13                            WLAN-BandIndicator-r13      OPTIONAL,
    rssiWLAN-r13                            WLAN-RSSI-Range-r13,
    availableAdmissionCapacityWLAN-r13      INTEGER (0. .31250)         OPTIONAL,
    backhaulDL-BandwidthWLAN-r13            WLAN-backhaulRate-r12       OPTIONAL,
    backhaulUL-BandwidthWLAN-r13            WLAN-backhaulRate-r12       OPTIONAL,
    channelUtilizationWLAN-r13              INTEGER (0. .255)           OPTIONAL,
    stationCountWLAN-r13                    INTEGER (0. .65535)         OPTIONAL,
    connectedWLAN-r13                       ENUMERATED{true}            OPTIONAL,
    ...
}
MeasResultListCBR-r14 : :=          SEQUENCE (SIZE (1. .maxCBR-Report-r14)) OF MeasResultCBR-r14
MeasResultCBR-r14 : := SEQUENCE {
    poolIdentity-r14    SL-V2X-TxPoolReportIdentity-r14,
    cbr-PSSCH-r14       SL-CBR-r14,
    cbr-PSCCH-r14       SL-CBR-r14                                              OPTIONAL
```

| MeasResults information element |  |  |
| --- | --- | --- |
| }<br>MeasResultForECID-r9 : :=<br>   ue-RxTxTimeDiffResult-r9<br>   currentSFN-r9<br>}<br>PLMN-IdentityList2 : :=<br>AdditionalSI-Info-r9 : :=<br>   csg-MemberStatus-r9<br>   csg-Identity-r9<br>}<br>MeasResultForRSSI-r13 : :=<br>   rssi-Result-r13<br>   channelOccupancy-r13<br>   . . .<br>}<br>UL-PDCP-DelayResultList-r13 : :=<br>UL-PDCP-DelayResult-r13 : :=<br>   qci-Id-r13<br><br>   excessDelay-r13<br>   . . .<br>}<br>-- ASN1STOP | SEQUENCE {<br>   INTEGER (0. .4095),<br>   BIT STRING (SIZE (10))<br><br>SEQUENCE (SIZE (1. .5)) OF PLMN-Identity<br>SEQUENCE{<br>ENUMERATED {member}<br>   CSG-Identity<br><br>SEQUENCE{<br>   RSSI-Range-r13,<br>   INTEGER (0. .100),<br><br><br>SEQUENCE (SIZE (1. .maxQCI-r13)) OF UL-PDCP-DelayResult-r13<br>SEQUENCE {<br>   ENUMERATED{qci1, qci2, qci3, qci4, spare4, spare3, spare2,<br>   spare1},<br>   INTEGER (0. .31), | <br><br><br><br><br><br>OPTIONAL,<br>OPTIONAL |

| MeasResults field descriptions |
| --- |
| availableAdmissionCapacityWLAN<br>Indicates the available admission capacity of WLAN as defined in IEEE 802.11-2012 [67].<br>backhaulDL-BandwidthWLAN<br>Indicates the backhaul available downlink bandwidth of WLAN, equal to Downlink Speed times Downlink Load defined in Wi-Fi Alliance Hotspot 2.0 [76].<br>backhaulUL-BandwidthWLAN<br>Indicates the backhaul available uplink bandwidth of WLAN, equal to Uplink Speed times Uplink Load defined in Wi-Fi Alliance Hotspot 2.0 [76].<br>bandWLAN<br>Indicates the WLAN band.<br>carrierInfoWLAN<br>Indicates the WLAN channel information.<br>cbr-PSSCH<br>Indicates the CBR measurement results on the PSSCH of the pool indicated by poolIdentity. If adjacencyPSCCH-PSSCH is set to TRUE for the pool indicated by poolIdentity, this field indicates the CBR measurement of both the PSSCH and PSCCH resources which are measured together.<br>cbr-PSCCH<br>Indicates the CBR measurement results on the PSCCH of the pool indicated by poolIdentity. This field is only included if adjacencyPSCCH-PSSCH is set to FALSE for the pool indicated by poolIdentity.<br>channelOccupancy<br>Indicates the percentage of samples when the RSSI was above the configured channelOccupancyThreshold for the associated reportConfig.<br>channelUtilizationWLAN<br>Indicates WLAN channel utilization as defined in IEEE 802.11-2012 [67].<br>connectedWLAN<br>Indicates whether the UE is connected to the WLAN for which the measurement results are applicable.<br>csg-MemberStatus<br>Indicates whether or not the UE is a member of the CSG of the neighbour cell.<br>currentSFN<br>Indicates the current system frame number when receiving the UE Rx-Tx time difference measurement results from lower layer.<br>excessDelay<br>Indicates excess queueing delay ratio in UL, according to excess delay ratio measurement report mapping table, as defined in TS 36.314 [71, Table 4.2.1.1.1-1]<br>locationAreaCode<br>A fixed length code identifying the location area within a PLMN, as defined in TS 23.003 [27].<br>measId<br>Identifies the measurement identity for which the reporting is being performed. If the measId-v1250 is included, the measId (i.e. without a suffix) is ignored by eNB.<br>measResult<br>Measured result of an E-UTRA cell;<br>Measured result of a UTRA cell;<br>Measured result of a GERAN cell or frequency;<br>Measured result of a CDMA2000 cell;<br>Measured result of a WLAN;<br>Measured result of UE Rx-Tx time difference;<br>Measured result of UE SFN, radio frame and subframe timing difference; or<br>Measured result of RSSI and channel occupancy. |

| MeasResults field descriptions |
| --- |
| measResultCSI-RS-List |
| Measured results of the CSI-RS resources in discovery signals measurement. |
| measResultListCDMA2000 |
| List of measured results for the maximum number of reported best cells for a CDMA2000 measurement identity. |
| measResultListEUTRA |
| List of measured results for the maximum number of reported best cells for an E-UTRA measurement identity. For BL UEs or UEs in CE, when operating in CE Mode B, measResult-v1360 is reported if the measured RSRP is less than −140 dBm. |
| measResultListGERAN |
| List of measured results for the maximum number of reported best cells or frequencies for a GERAN measurement identity. |
| measResultListUTRA |
| List of measured results for the maximum number of reported best cells for a UTRA measurement identity. |
| measResultListWLAN |
| List of measured results for the maximum number of reported best WLAN outside the WLAN mobility set and connected WLAN, if any, for a WLAN measurement identity. |
| measResultPCell |
| Measured result of the PCell. For BL UEs or UEs in CE, when operating in CE Mode B, measResultPCell-v1360 is reported if the measured RSRP is less than −140 dBm. |
| measResultsCDMA2000 |
| Contains the CDMA2000 HRPD pre-registration status and the list of CDMA2000 measurements. |
| MeasResultServFreqList |
| Measured results of the serving frequencies: the measurement result of each SCell, if any, and of the best neighbouring cell on each serving frequency. For BL UEs or UEs in CE, when operating in CE Mode B, measResultBestNeighCell-v1360 is reported if the measured RSRP is less than −140 dBm. |
| pilotPnPhase |
| Indicates the arrival time of a CDMA2000 pilot, measured relative to the UE's time reference in units of PN chips, see C.S0005 [25]. This information is used in either SRVCC handover or enhanced 1xRTT CS fallback procedure to CDMA2000 1xRTT. |
| pilotStrength |
| CDMA2000 Pilot Strength, the ratio of pilot power to total power in the signal bandwidth of a CDMA2000 Forward Channel. See C.S0005 [25] for CDMA2000 1xRTT and C.S0024 [26] for CDMA2000 HRPD. |
| poolIdentity |
| The identity of the transmission resource pool which is corresponding to the poolReportId configured in a resource pool for V2X sidelink communication. |
| plmn-IdentityList |
| The list of PLMN Identity read from broadcast information when the multiple PLMN Identities are broadcast. |
| preRegistrationStatusHRPD |
| Set to TRUE if the UE is currently pre-registered with CDMA2000 HRPD. Otherwise set to FALSE. This can be ignored by the eNB for CDMA2000 1xRTT. |
| qci-Id |
| Indicates QCI value for which excessDelay is provided, according to TS 36.314 [71]. |
| routingAreaCode |
| The RAC identity read from broadcast information, as defined in TS 23.003 [27]. |
| rsrpResult |
| Measured RSRP result of an E-UTRA cell. |
| The rsrpResult is only reported if configured by the eNB. |
| rsrqResult |
| Measured RSRQ result of an E-UTRA cell. |
| The rsrqResult is only reported if configured by the eNB. |
| rssi |
| GERAN Carrier RSSI. RXLEV is mapped to a value between 0 and 63, TS 45.008 [28]. When mapping the RXLEV value to the RSSI bit string, the first/leftmost bit of the bit string contains the most significant bit. |
| rssi-Result |
| Measured RSSI result in dBm. |
| rs-sinr-Result |
| Measured RS-SINR result of an E-UTRA or NR cell. The rs-sinr-Result is only reported if configured by the eNB. |
| rssiWLAN |
| Measured WLAN RSSI result in dBm. |
| stationCountWLAN |
| Indicates the total number stations currently associated with this WLAN as defined in IEEE 802.11-2012 [67]. |
| ue-RxTxTimeDiffResult |
| UE Rx-Tx time difference measurement result of the PCell, provided by lower layers. If ue-RxTxTimeDiffPeriodicalTDD-r13 is set to TRUE, the measurement mapping is according to EUTRAN TDD UE Rx-Tx time difference report mapping in TS 36.133 [16] and measurement result includes $N_{TAoffset}$, else the measurement mapping is according to EUTRAN FDD UE Rx-Tx time difference report mapping in TS 36.133 [16]. |
| utra-EcN0 |
| According to CPICH_Ec/No in TS 25.133 [29] for FDD. Fourteen spare values. The field is not present for TDD. |
| utra-RSCP |
| According to CPICH_RSCP in TS 25.133 [29] for FDD and P-CCPCH_RSCP in TS 25.123 [30] for TDD. Thirty-one spare values. |
| wlan-Identifiers |
| Indicates the WLAN parameters used for identification of the WLAN for which the measurement results are applicable. |

MeasResultSSTD

The IE MeasResultSSTD consists of SFN, radio frame and subframe boundary difference between the PCell and the PSCell as specified in TS 36.214 and TS 36.133 [16].

| MeasResultSSTD information element |
| --- |
| -- ASN1START |
| MeasResultSSTD-r13 ::=    SEQUENCE { |
|   sfn-OffsetResult-r13    INTEGER (0. .1023), |
|   frameBoundaryOffsetResult-r13    INTEGER (-5. .4), |
|   subframeBoundaryOffsetResult-r13    INTEGER (0. .127) |
| } |
| -- ASN1STOP |

| MeasResultSSTD field descriptions |
| --- |
| sfn-OffsetResult |
| Indicates the SFN difference between the PCell and the PSCell as an integer value according to TS 36.214 [48]. |
| frameBoundaryOffsetResult |
| Indicates the frame boundary difference between the PCell and the PSCell as an integer value according to TS 36.214 [48]. |
| subframeBoundaryOffsetResult |
| Indicates the subframe boundary difference between the PCell and the PSCell as an integer value according to the mapping table in TS 36.133 [16]. |

MeasResultSFTD

The IE MeasResultSFTD consists of SFN and radio frame boundary difference between the PCell and an NR PSCell or a set of cells as specified in TS 36.214 and TS 36.133 [16].

| MeasResultSFTD information element |
| --- |
| -- ASN1START |
| MeasResultSFTD-r15 ::= SEQUENCE (SIZE(1. . maxCellSFTDMeas)) OF MeasurementResultSFTD-r15 |
| MeasurementResultSFTD-r15 ::=    SEQUENCE { |
|   sfn-OffsetResult-r15    INTEGER (0. .1023), |
|   frameBoundaryOffsetResult-r13    INTEGER (-30720. .30719) |
| } |
| -- ASN1STOP |

| MeasResultSSTD field descriptions |
| --- |
| sfn-OffsetResult |
| Indicates the SFN difference between the PCell and the PSCell as an integer value according to TS 36.214 [48]. |
| frameBoundaryOffsetResult |
| Indicates the frame boundary difference between the PCell and the NR PSCell or neighbor cell as an integer value according to TS 36.214 [48]. |

<Omitted Text>

ReportConfigInterRAT

The IE ReportConfigInterRAT specifies criteria for triggering of an inter-RAT measurement reporting event. The inter-RAT measurement reporting events for NR, UTRAN, GERAN and CDMA2000 are labelled BN with N equal to 1, 2 and so on. The inter-RAT measurement reporting events for WLAN are labelled WN with N equal to 1, 2 and so on.

Event B1: Neighbour becomes better than absolute threshold;

Event B2: PCell becomes worse than absolute threshold1 AND Neighbour becomes better than another absolute threshold2.

Event W1: WLAN becomes better than a threshold;

Event W2: All WLAN inside WLAN mobility set become worse than a threshold1 and a WLAN outside WLAN mobility set becomes better than a threshold2;

Event W3: All WLAN inside WLAN mobility set become worse than a threshold.

The b1 and b2 event thresholds for CDMA2000 are the CDMA2000 pilot detection thresholds are expressed as an unsigned binary number equal to $[-2 \times 10 \log 10\ E_c/I_o]$ in units of 0.5 dB, see C.S0005[25] for details.

| ReportConfigInterRAT information element |
| --- |
| -- ASN1START |
| ReportConfigInterRAT ::=    SEQUENCE { |
|   triggerType    CHOICE { |
|     event    SEQUENCE { |
|       eventId    CHOICE { |

| ReportConfigInterRAT information element |
| --- |

```
        eventB1                          SEQUENCE {
          b1-Threshold                     CHOICE {
            b1-ThresholdUTRA                 ThresholdUTRA,
            b1-ThresholdGERAN                ThresholdGERAN,
            b1-ThresholdCDMA2000             ThresholdCDMA2000
          }
        },
        eventB2                          SEQUENCE {
          b2-Threshold1                    ThresholdEUTRA,
          b2-Threshold2                    CHOICE {
            b2-Threshold2UTRA                ThresholdUTRA,
            b2-Threshold2GERAN               ThresholdGERAN,
            b2-Threshold2CDMA2000            ThresholdCDMA2000
          }
        },
        . . .,
        eventW1-r13                      SEQUENCE {
          w1-Threshold-r13                 WLAN-RSSI-Range-r13
        },
        eventW2-r13                      SEQUENCE {
          w2-Threshold1-r13                WLAN-RSSI-Range-r13,
          w2-Threshold2-r13                WLAN-RSSI-Range-r13
        },
        eventW3-r13                      SEQUENCE {
          w3-Threshold-r13                 WLAN-RSSI-Range-r13
        },
        eventB1-NR                         SEQUENCE {
          b1-ThresholdNR-r15                 ThresholdNR-r15          OPTIONAL, -- Need ON
          reportOnLeave-r15                  BOOLEAN                  OPTIONAL -- Need ON
        },
          b2-Threshold1-r15                  ThresholdEUTRA           OPTIONAL, -- Need ON
          b2-Threshold2NR-r15                ThresholdNR-r15          OPTIONAL, -- Need ON
          reportOnLeave-r15                  BOOLEAN                  OPTIONAL -- Need ON
        }
      },
      hysteresis                       Hysteresis,
      timeToTrigger                    TimeToTrigger
    },
    periodical                         SEQUENCE {
      purpose                            ENUMERATED {
                                           reportStrongestCells,
                                           reportStrongestCellsForSON,
                                           reportCGI }
    }
  },
  maxReportCells                   INTEGER (1. .maxCellReport),
  reportInterval                   ReportInterval,
  reportAmount                     ENUMERATED {r1, r2, r4, r8, r16, r32, r64, infinity},
  . . .,
  [[ si-RequestForHO-r9              ENUMERATED {setup}       OPTIONAL -- Cond reportCGI
  ]],
  [[ reportQuantityUTRA-FDD-r10     ENUMERATED {both}         OPTIONAL -- Need OR
  ]],
  [[ includeLocationInfo-r11        BOOLEAN                   OPTIONAL -- Need ON
  ]],
  [[ b2-Threshold1-v1250            CHOICE {
       release                        NULL,
       setup                          RSRQ-Range-v1250
     }                                                        OPTIONAL -- Need ON
  ]],
  [[ reportQuantityWLAN-r13         ReportQuantityWLAN-r13    OPTIONAL -- Need ON
  ]],
  [[ reportAnyWLAN-r14              BOOLEAN                   OPTIONAL -- Need ON
  ]],
  [[ reportQuantityCellNR-r15       ReportQuantityNR-r15      OPTIONAL, -- Need ON
     maxRS-IndexReport-r15          INTEGER (1. .maxRS-Index-r15) OPTIONAL, -- Need ON,
     reportQuantityRS-IndexNR-r15   ReportQuantityNR-r15      OPTIONAL, -- Need ON
     reportRS-IndexResultsNR        BOOLEAN                   OPTIONAL, -- Need ON
       measResultSFTD-r15             ENUMERATED {pSCell, neighborCells} OPTIONAL --
Need ON
  ]]
}
ThresholdUTRA : :=                CHOICE{
  utra-RSCP                         INTEGER (-5. .91),
  utra-EcN0                         INTEGER (0. .49)
}
ThresholdGERAN : :=            INTEGER (0. .63)
```

| ReportConfigInterRAT information element |
| --- |

```
ThresholdCDMA2000 : :=              INTEGER (0. .63)
ReportQuantityNR-r15 : :=           SEQUENCE {
    ss-rsrp                             BOOLEAN,
    ss-rsrq                             BOOLEAN,
    ss-sinr                             BOOLEAN
}
ReportQuantityWLAN-r13 : :=         SEQUENCE {
    bandRequestWLAN-r13                         ENUMERATED {true} OPTIONAL, -- Need OR
    carrierInfoRequestWLAN-r13                  ENUMERATED {true} OPTIONAL, -- Need OR
    availableAdmissionCapacityRequestWLAN-r13   ENUMERATED {true} OPTIONAL, -- Need OR
    backhaulDL-BandwidthRequestWLAN-r13         ENUMERATED {true} OPTIONAL, -- Need OR
    backhaulUL-BandwidthRequestWLAN-r13         ENUMERATED {true} OPTIONAL, -- Need OR
    channelUtilizationRequestWLAN-r13           ENUMERATED {true} OPTIONAL, -- Need OR
    stationCountRequestWLAN-r13                 ENUMERATED {true} OPTIONAL, -- Need OR
    . . .
}
-- ASN1STOP
```

| ReportConfigInterRAT field descriptions |
| --- | availableAdmissionCapacityRequestWLAN
The value true indicates that the UE shall include, if available, WLAN Available Admission Capacity in measurement reports.
backhaulDL-BandwidthRequestWLAN
The value true indicates that the UE shall include, if available, WLAN Backhaul Downlink Bandwidth in measurement reports.
backhaulUL-BandwidthRequestWLAN
The value true indicates that the UE shall include, if available, WLAN Backhaul Uplink Bandwidth in measurement reports.
bandRequestWLAN
The value true indicates that the UE shall include WLAN band in measurement reports.
bN-ThresholdM
Threshold to be used in inter RAT measurement report triggering condition for event number bN. If multiple thresholds are defined for event number bN, the thresholds are differentiated by M.
carrierInfoRequestWLAN
The value true indicates that the UE shall include, if available, WLAN Carrier Information in measurement reports.
channelUtilizationRequest-WLAN
The value true indicates that the UE shall include, if available, WLAN Channel Utilization in measurement reports.
eventId
Choice of inter-RAT event triggered reporting criteria.
maxReportCells
Max number of cells, excluding the serving cell, to include in the measurement report. In case purpose is set to reportStrongestCellsForSON only value 1 applies. For inter-RAT WLAN, it is the maximum number of WLANs to include in the measurement report.
Purpose
reportStrongestCellsForSON applies only in case reportConfig is linked to a measObject set to measObjectUTRA or measObjectCDMA2000.
reportAmount
Number of measurement reports applicable for triggerType event as well as for triggerType periodical. In case purpose is set to reportCGI or reportStrongestCellsForSON only value 1 applies. In case reportSSTD-Meas is configured, only value 1 applies.
reportAnyWLAN
Indicates UE to report any WLAN AP meeting the triggering requirements, even if it is not included in the corresponding MeasObjectWLAN.
reportOnLeave
Indicates whether or not the UE shall initiate the measurement reporting procedure when the leaving condition is met for a cell in cellsTriggeredList, as specified in 5.5.4.1.
reportQuantityUTRA-FDD
The quantities to be included in the UTRA measurement report. The value both means that both the cpich RSCP and cpich EcN0 quantities are to be included in the measurement report.
reportSFTD-Meas
If this field is set to pSCell, the UE shall measure SSTD between the PCell and the PSCell as specified in TS 36.214 [48]. . If the field is set to neighborCells, the UE shall measure SFTD between the PCell and the NR cells, as specified in TS 36.214 [48]. E-UTRAN only includes this field when setting triggerType to periodical and purpose to reportStrongestCells. If included, the UE shall ignore the triggerType and maxReportCells fields.
si-RequestForHO
The field applies to the reportCGI functionality, and when the field is included, the UE is allowed to use autonomous gaps in acquiring system information from the neighbour cell, applies a different value for T321, and includes different fields in the measurement report.
availableAdmissionCapacityRequestWLAN
The value true indicates that the UE shall include, if available, WLAN Available Admission Capacity in measurement reports.

backhaulDL-BandwidthRequestWLAN
The value true indicates that the UE shall include, if available, WLAN Backhaul Downlink Bandwidth in measurement reports.
backhaulUL-BandwidthRequestWLAN
The value true indicates that the UE shall include, if available, WLAN Backhaul Uplink Bandwidth in measurement reports.
bandRequestWLAN
The value true indicates that the UE shall include WLAN band in measurement reports.
stationCountRequestWLAN
The value true indicates that the UE shall include, if available, WLAN Station Count in measurement reports.
b1-ThresholdGERAN, b2-Threshold2GERAN
The actual value is field value - 110 dBm.
b1-ThresholdUTRA, b2-Threshold2UTRA
utra-RSCP corresponds to CPICH_RSCP in TS 25.133 [29] for FDD and P-CCPCH_RSCP in TS 25.123 [30] for TDD.
utra-EcN0 corresponds to CPICH_Ec/No in TS 25.133 [29] for FDD, and is not applicable for TDD.
For utra-RSCP: The actual value is field value - 115 dBm.
For utra-EcN0: The actual value is (field value - 49)/2 dB.
timeToTrigger
Time during which specific criteria for the event needs to be met in order to trigger a measurement report.
triggerType
E-UTRAN does not configure the value periodical in case reportConfig is linked to a measObject set to measObjectWLAN.

| Conditional presence | Explanation |
| --- | --- |
| reportCGI | The field is optional, need OR, in case purpose is included and set to reportCGI; otherwise the field is not present and the UE shall delete any existing value for the field. |

Figure 3:
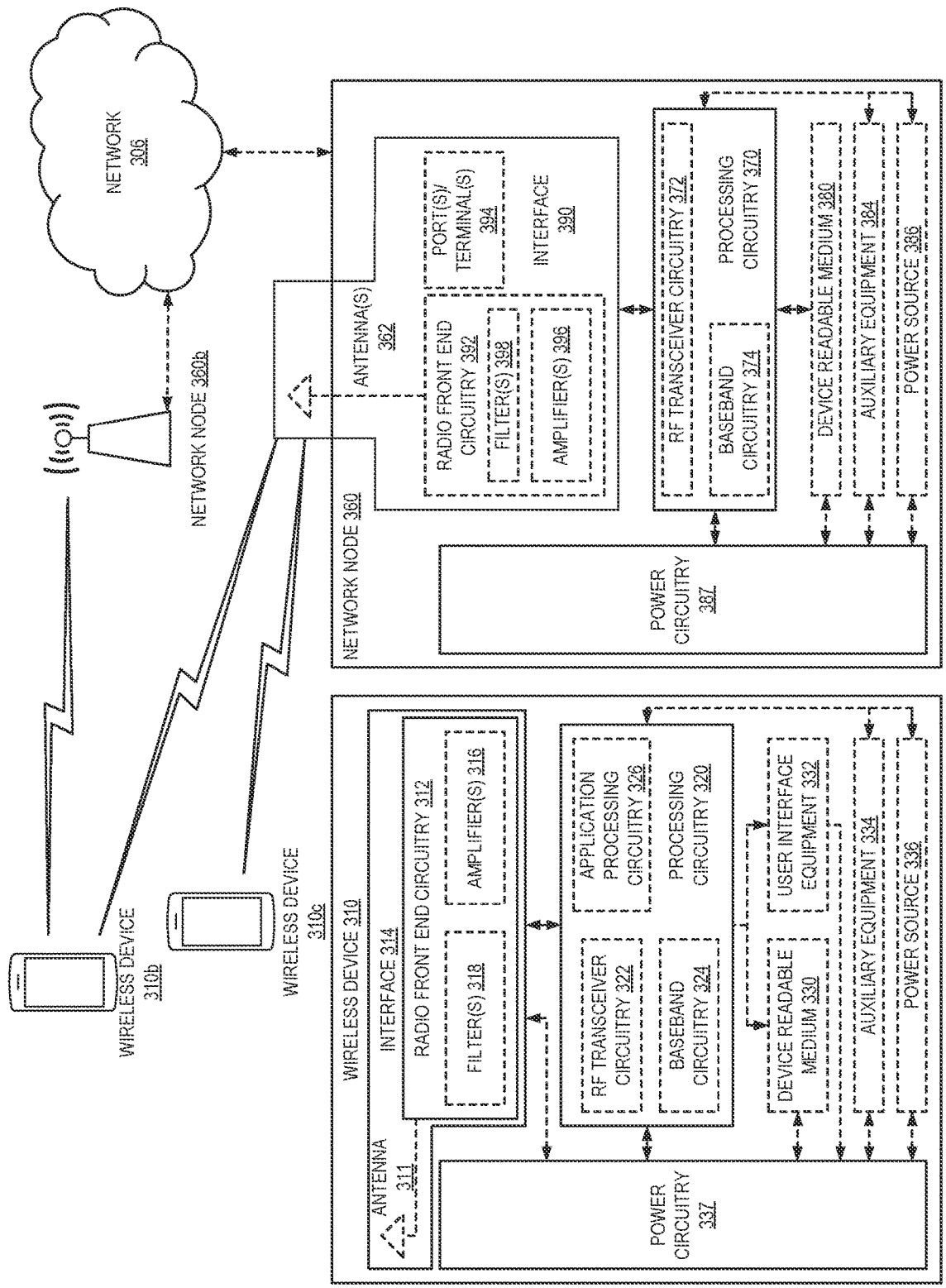
FIG. 3 illustrates an example of a wireless network in which embodiments of the present disclosure may be implemented.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 306, network nodes 360 and 360b, and WDs 310, 310b, and 310c. In practice, a wireless network may further include any additional elements suitable to support communication between wireless devices or between a wireless device and another communication device, such as a landline telephone, a service provider, or any other network node or end device. Of the illustrated components, network node 360 and wireless device (WD) 310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards. However, in some preferred embodiments, the wireless network is configured to operate according to the 3GPP 5G standard, which is referred to as NR, as discussed above.

Network 306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 360 and WD 310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs), and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 360 includes processing circuitry 370, device readable medium 380, interface 390, auxiliary equipment 384, power source 386, power circuitry 387, and antenna 362. Although network node 360 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules).

Similarly, network node 360 may be composed of multiple physically separate components (e.g., a NodeB component and a RNC component, or a BTS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, GSM, WCDMA, LTE, NR, WiFi, or Bluetooth wireless technologies. These wireless technologies may be integrated into the same or different chip or set of chips and other components within network node 360.

Processing circuitry 370 is configured to perform any determining, calculating, or similar operations (e.g., certain obtaining operations) described herein as being provided by a network node. These operations performed by processing circuitry 370 may include processing information obtained by processing circuitry 370 by, for example, converting the obtained information into other information, comparing the obtained information or converted information to information stored in the network node, and/or performing one or more operations based on the obtained information or converted information, and as a result of said processing making a determination.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units In certain embodiments, some or all of the functionality described herein as being provided by a network node, base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360, but are enjoyed by network node 360 as a whole, and/or by end users and the wireless network generally.

Device readable medium 380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 370. Device readable medium 380 may store any suitable instructions, data or information, including a computer program, software, an application including one or more of logic, rules, code, tables, etc. and/or other instructions capable of being executed by processing circuitry 370 and, utilized by network node 360. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signaling and/or data between network node 360, network 306, and/or WDs 310. As illustrated, interface 390 comprises port(s)/terminal(s) 394 to send and receive data, for example to and from network 306 over a wired connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or WDs via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 3 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IOT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 310 includes antenna 311, interface 314, processing circuitry 320, device readable medium 330, user interface equipment 332, auxiliary equipment 334, power source 336 and power circuitry 337. WD 310 may include multiple sets of one or more of the illustrated components for different wireless technologies supported by WD 310, such as, for example, GSM, WCDMA, LTE, NR, WiFi, WiMAX, or Bluetooth wireless technologies, just to mention a few. These wireless technologies may be integrated into the same or different chips or set of chips as other components within WD 310.

Antenna 311 may include one or more antennas or antenna arrays, configured to send and/or receive wireless signals, and is connected to interface 314. In certain alternative embodiments, antenna 311 may be separate from WD 310 and be connectable to WD 310 through an interface or port. Antenna 311, interface 314, and/or processing circuitry 320 may be configured to perform any receiving or transmitting operations described herein as being performed by a WD. Any information, data and/or signals may be received from a network node and/or another WD. In some embodiments, radio front end circuitry and/or antenna 311 may be considered an interface.

As illustrated, interface 314 comprises radio front end circuitry 312 and antenna 311. Radio front end circuitry 312 comprise one or more filters 318 and amplifiers 316. Radio front end circuitry 314 is connected to antenna 311 and processing circuitry 320, and is configured to condition signals communicated between antenna 311 and processing circuitry 320. Radio front end circuitry 312 may be coupled to or a part of antenna 311. In some embodiments, WD 310 may not include separate radio front end circuitry 312; rather, processing circuitry 320 may comprise radio front end circuitry and may be connected to antenna 311. Similarly, in some embodiments, some or all of RF transceiver circuitry 322 may be considered a part of interface 314. Radio front end circuitry 312 may receive digital data that is to be sent out to other network nodes or WDs via a wireless connection. Radio front end circuitry 312 may convert the digital data into a radio signal having the appropriate channel and bandwidth parameters using a combination of filters 318 and/or amplifiers 316. The radio signal may then be transmitted via antenna 311. Similarly, when receiving data, antenna 311 may collect radio signals which are then converted into digital data by radio front end circuitry 312. The digital data may be passed to processing circuitry 320. In other embodiments, the interface may comprise different components and/or different combinations of components.

Processing circuitry 320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 310 components, such as device readable medium 330, WD 310 functionality. Such functionality may include providing any of the various wireless features or benefits discussed herein. For example, processing circuitry 320 may execute instructions stored in device readable medium 330 or in memory within processing circuitry 320 to provide the functionality disclosed herein.

As illustrated, processing circuitry 320 includes one or more of RF transceiver circuitry 322, baseband processing circuitry 324, and application processing circuitry 326. In other embodiments, the processing circuitry may comprise different components and/or different combinations of components. In certain embodiments processing circuitry 320 of WD 310 may comprise a SOC. In some embodiments, RF transceiver circuitry 322, baseband processing circuitry 324, and application processing circuitry 326 may be on separate chips or sets of chips. In alternative embodiments, part or all of baseband processing circuitry 324 and application processing circuitry 326 may be combined into one chip or set of chips, and RF transceiver circuitry 322 may be on a separate chip or set of chips. In still alternative embodiments, part or all of RF transceiver circuitry 322 and baseband processing circuitry 324 may be on the same chip or set of chips, and application processing circuitry 326 may be on a separate chip or set of chips. In yet other alternative embodiments, part or all of RF transceiver circuitry 322, baseband processing circuitry 324, and application processing circuitry 326 may be combined in the same chip or set of chips. In some embodiments, RF transceiver circuitry 322 may be a part of interface 314. RF transceiver circuitry 322 may condition RF signals for processing circuitry 320.

In certain embodiments, some or all of the functionality described herein as being performed by a WD may be provided by processing circuitry 320 executing instructions stored on device readable medium 330, which in certain embodiments may be a computer-readable storage medium. In alternative embodiments, some or all of the functionality may be provided by processing circuitry 320 without executing instructions stored on a separate or discrete device readable storage medium, such as in a hard-wired manner. In any of those particular embodiments, whether executing instructions stored on a device readable storage medium or not, processing circuitry 320 can be configured to perform the described functionality. The benefits provided by such functionality are not limited to processing circuitry 320 alone or to other components of WD 310, but are enjoyed by WD 310 as a whole, and/or by end users and the wireless network generally.

Processing circuitry 320 may be configured to perform any determining, calculating, or similar operations (e.g., certain obtaining operations) described herein as being performed by a WD. These operations, as performed by processing circuitry 320, may include processing information obtained by processing circuitry 320 by, for example, converting the obtained information into other information, comparing the obtained information or converted information to information stored by WD 310, and/or performing one or more operations based on the obtained information or converted information, and as a result of said processing making a determination.

Device readable medium 330 may be operable to store a computer program, software, an application including one or more of logic, rules, code, tables, etc. and/or other instructions capable of being executed by processing circuitry 320. Device readable medium 330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 320. In some embodiments, processing circuitry 320 and device readable medium 330 may be considered to be integrated.

User interface equipment 332 may provide components that allow for a human user to interact with WD 310. Such interaction may be of many forms, such as visual, audial, tactile, etc. User interface equipment 332 may be operable to produce output to the user and to allow the user to provide input to WD 310. The type of interaction may vary depending on the type of user interface equipment 332 installed in WD 310. For example, if WD 310 is a smart phone, the interaction may be via a touch screen; if WD 310 is a smart meter, the interaction may be through a screen that provides usage (e.g., the number of gallons used) or a speaker that provides an audible alert (e.g., if smoke is detected). User interface equipment 332 may include input interfaces, devices and circuits, and output interfaces, devices and circuits. User interface equipment 332 is configured to allow input of information into WD 310, and is connected to processing circuitry 320 to allow processing circuitry 320 to process the input information. User interface equipment 332 may include, for example, a microphone, a proximity or other sensor, keys/buttons, a touch display, one or more cameras, a USB port, or other input circuitry. User interface equipment 332 is also configured to allow output of information from WD 310, and to allow processing circuitry 320 to output information from WD 310. User interface equipment 332 may include, for example, a speaker, a display, vibrating circuitry, a USB port, a headphone interface, or other output circuitry. Using one or more input and output interfaces, devices, and circuits, of user interface equipment 332, WD 310 may communicate with end users and/or the wireless network, and allow them to benefit from the functionality described herein.

Auxiliary equipment 334 is operable to provide more specific functionality which may not be generally performed by WDs. This may comprise specialized sensors for doing measurements for various purposes, interfaces for additional types of communication such as wired communications etc. The inclusion and type of components of auxiliary equipment 334 may vary depending on the embodiment and/or scenario.

Power source 336 may, in some embodiments, be in the form of a battery or battery pack. Other types of power sources, such as an external power source (e.g., an electricity outlet), photovoltaic devices or power cells, may also be used. WD 310 may further comprise power circuitry 337 for delivering power from power source 336 to the various parts of WD 310 which need power from power source 336 to carry out any functionality described or indicated herein. Power circuitry 337 may in certain embodiments comprise power management circuitry. Power circuitry 337 may additionally or alternatively be operable to receive power from an external power source; in which case WD 310 may be connectable to the external power source (such as an electricity outlet) via input circuitry or an interface such as an electrical power cable. Power circuitry 337 may also in certain embodiments be operable to deliver power from an external power source to power source 336. This may be, for example, for the charging of power source 336. Power circuitry 337 may perform any formatting, converting, or other modification to the power from power source 336 to make the power suitable for the respective components of WD 310 to which power is supplied.

Figure 4:
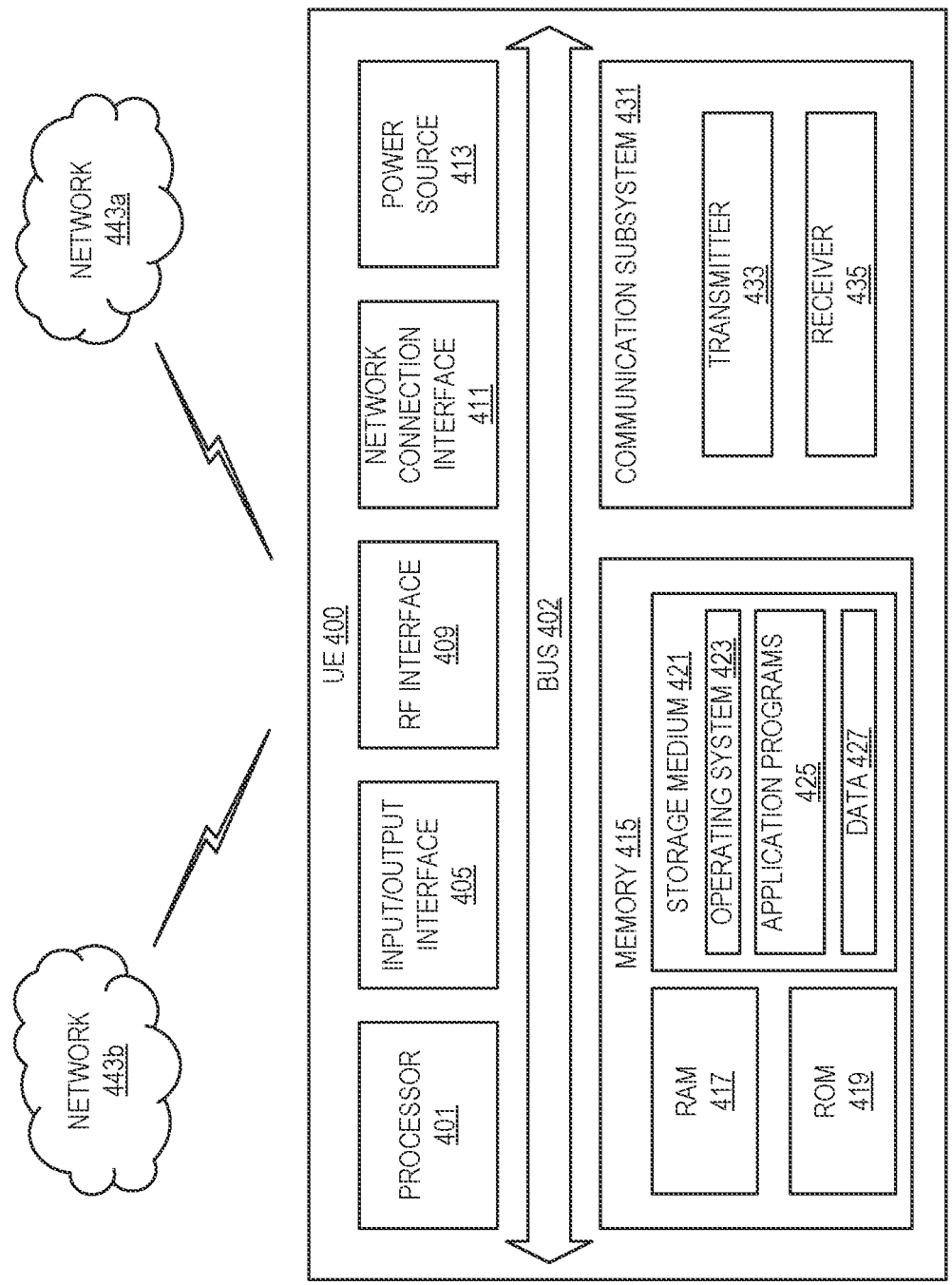
FIG. 4 illustrates one embodiment of a UE in accordance with various aspects described herein.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the $3^{rd}$ Generation Partnership Project (3GPP), including a NB-IOT UE that is not intended for sale to, or operation by, a human user. UE 400, as illustrated in FIG. 4, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 4 is a UE, the components discussed herein are equally applicable to a WD, and vice-versa.

In FIG. 4, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 409 may be configured to provide a communication interface to RF components such as a transmitter, a receiver, and an antenna. Network connection interface 411 may be configured to provide a communication interface to network 443a. Network 443a may encompass wired and/or wireless networks such as a local-area network (LAN), a wide-area network (WAN), a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 4, processing circuitry 401 may be configured to communicate with network 443b using communication subsystem 431. Network 443a and network 443b may be the same network or networks or different network or networks. Communication subsystem 431 may be configured to include one or more transceivers used to communicate with network 443b. For example, communication subsystem 431 may be configured to include one or more transceivers used to communicate with one or more remote transceivers of another device capable of wireless communication such as another WD, UE, or base station of a radio access network (RAN) according to one or more communication protocols, such as IEEE 802.3, CDMA, WCDMA, GSM, LTE, UTRAN, WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443b may encompass wired and/or wireless networks such as a local-area network (LAN), a wide-area network (WAN), a computer network, a wireless network, a telecommunications network, another like network or any combination thereof. For example, network 443b may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 5:
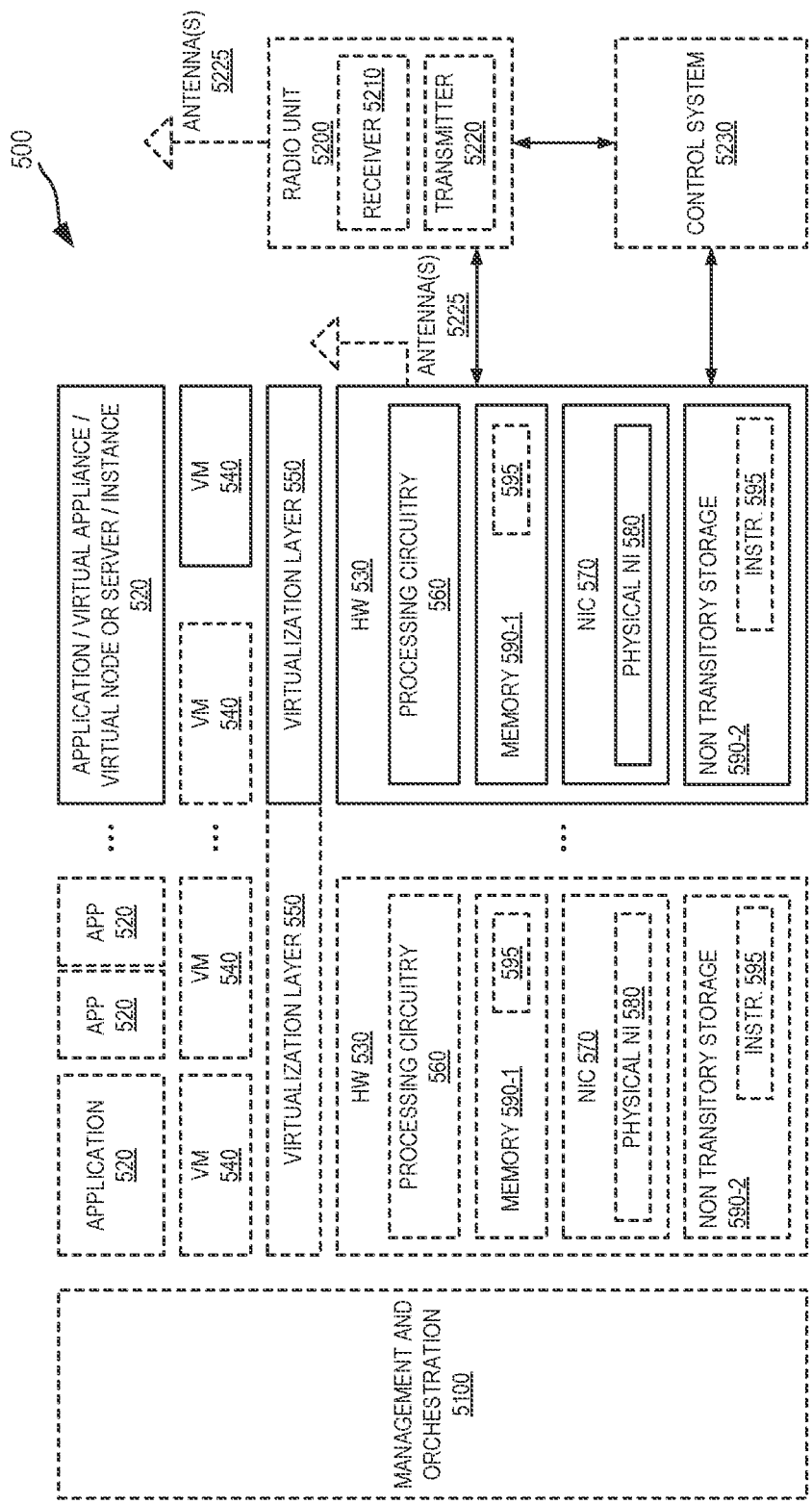
FIG. 5 is a schematic block diagram illustrating a virtualization environment in which functions implemented by some embodiments may be virtualized.

FIG. 5 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 5, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 5.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signaling can be effected with the use of control system 5230 which may alternatively be used for communication between the hardware nodes 530 and radio units 5200.

Figure 6:
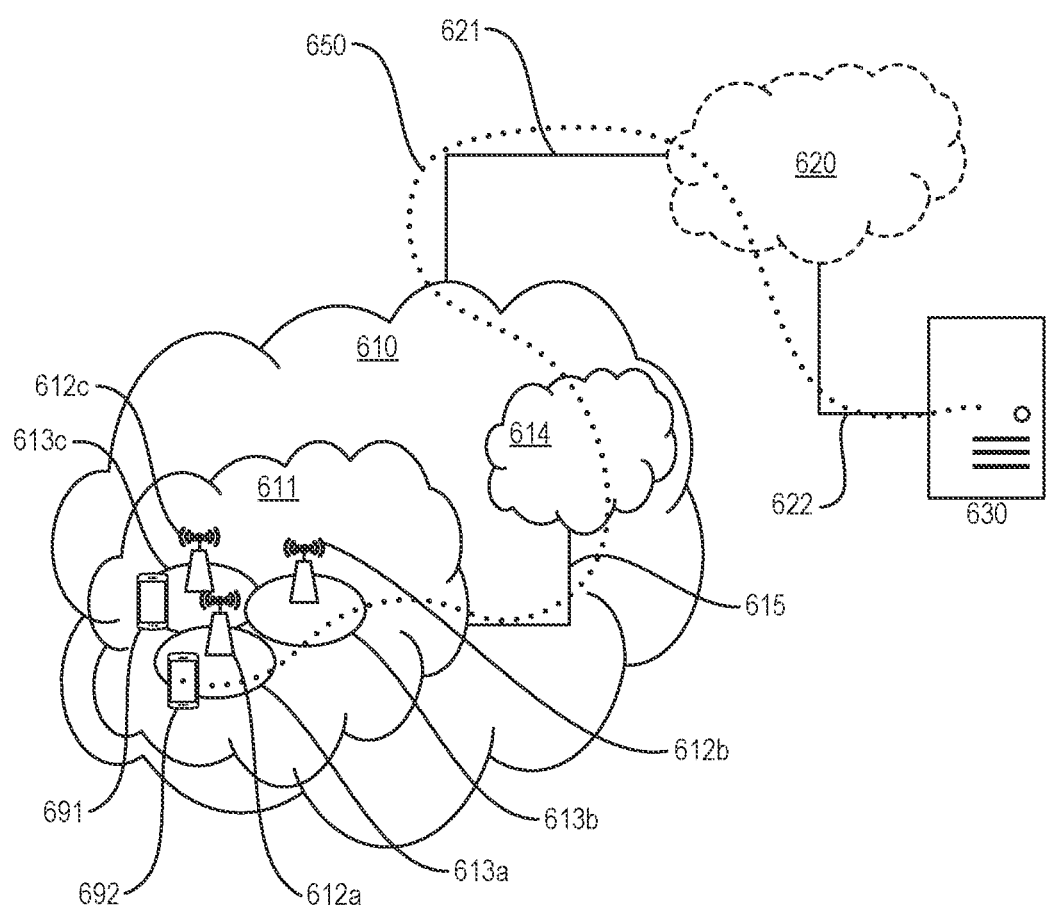
FIG. 6 illustrates an example of a communication system in which embodiments of the present disclosure may be implemented.

With reference to FIG. 6, in accordance with an embodiment, a communication system includes telecommunication network 610, such as a 3GPP-type cellular network, which comprises access network 611, such as a radio access network, and core network 614. Access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to core network 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more subnetworks (not shown).

The communication system of FIG. 6 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Example implementations, in accordance with an embodiment, of the UE, base station and host computer discussed in the preceding paragraphs will now be described with reference to FIG. 7. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 7) served by base station 720. Communication interface 726 may be configured to facilitate connection 760 to host computer 710. Connection 760 may be direct or it may pass through a core network (not shown in FIG. 7) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

Figure 7:
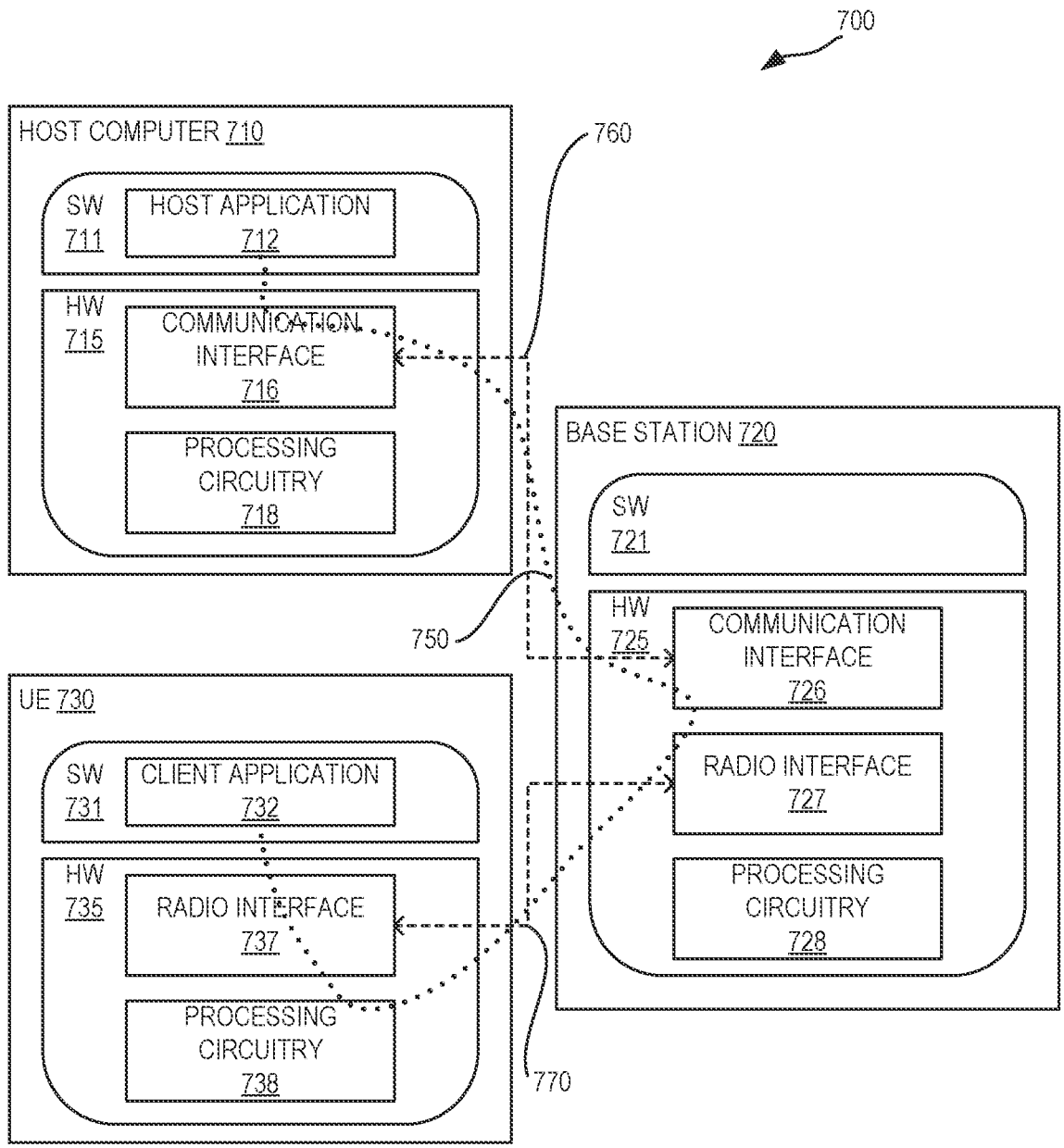
FIG. 7 illustrates additional details regarding the host computer, base station, and UE in the communication system of FIG. 6 in accordance with some embodiments of the present disclosure.

It is noted that host computer 710, base station 720 and UE 730 illustrated in FIG. 7 may be similar or identical to host computer 630, one of base stations 612a, 612b, 612c and one of UEs 691, 692 of FIG. 6, respectively. This is to say, the inner workings of these entities may be as shown in FIG. 7 and independently, the surrounding network topology may be that of FIG. 6.

In FIG. 7, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve the data rate, latency and power consumption, and thereby provide benefits such as reduced user waiting time, relaxed restriction on file size, better responsiveness, and extended battery lifetime.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figure 8:
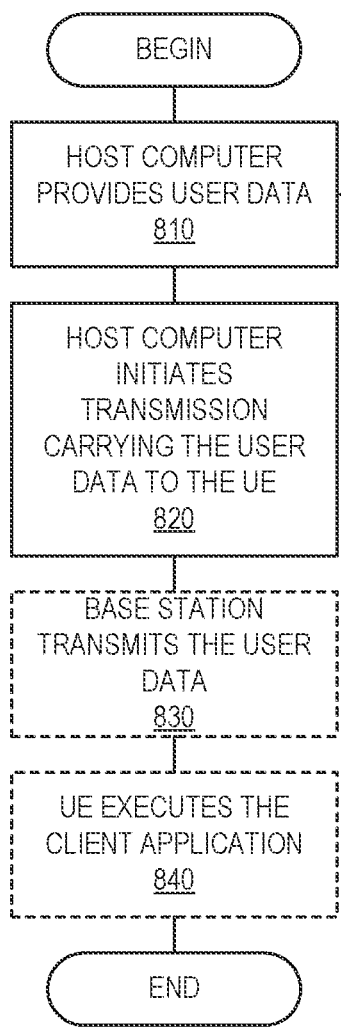

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

Figure 9:
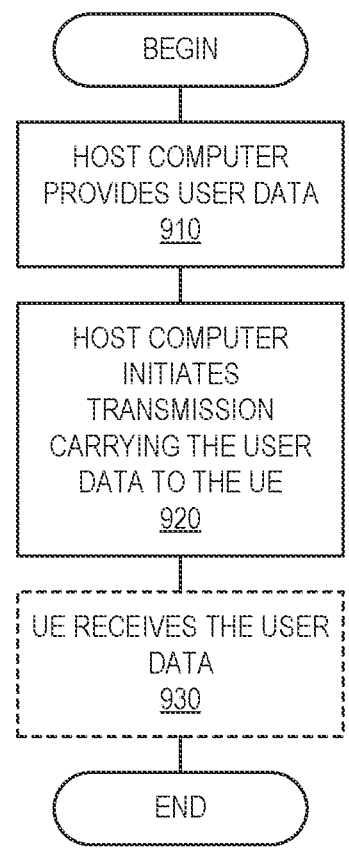

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
BSC Base Station Controller
BTS Base Transceiver Station
CD Compact Disk
COTS Commercial Off-the-Shelf
CPE Customer Premise Equipment
CPU Central Processing Unit
D2D Device-to-Device DAS Distributed Antenna System
DSP Digital Signal Processor
DVD Digital Video Disk
eNB Enhanced or Evolved Node B
E-SMLC Evolved Serving Mobile Location Center
FPGA Field Programmable Gate Array
GHz Gigahertz
gNB New Radio Base Station
GSM Global System for Mobile Communications
IoT Internet of Things
IP Internet Protocol
LEE Laptop Embedded Equipment
LME Laptop Mounted Equipment
LTE Long Term Evolution
M2M Machine-to-Machine
MANO Management and Orchestration
MCE Multi-Cell/Multicast Coordination Entity
MDT Minimization of Drive Tests
MIMO Multiple Input Multiple Output
MME Mobility Management Entity
MSC Mobile Switching Center
MSR Multi-Standard Radio
MTC Machine Type Communication
NB-IOT Narrowband Internet of Things
NFV Network Function Virtualization
NIC Network Interface Controller
NR New Radio
O&M Operation and Maintenance
OSS Operations Support System
OTT Over-the-Top
PDA Personal Digital Assistant
P-GW Packet Data Network Gateway
RAM Random Access Memory
RAN Radio Access Network
RAT Radio Access Technology
RF Radio Frequency
RNC Radio Network Controller
ROM Read Only Memory
RRH Remote Radio Head
RRU Remote Radio Unit
SCEF Service Capability Exposure Function
SOC System on a Chip
SON Self-Organizing Network
UE User Equipment
USB Universal Serial Bus
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WCDMA Wideband Code Division Multiple Access
WiMax Worldwide Interoperability for Microwave Access Those skilled in the art will recognize improvements and modifications to the embodiments of the present disclosure. All such improvements and modifications are considered within the scope of the concepts disclosed herein.

What is claimed is:

1. A method of operation of a User Equipment (UE) in a wireless network to perform System Frame Number (SFN) Frame Time Difference (SFTD) measurements between a Primary Cell (PCell) of the UE and one or more other cells, the method comprising:
receiving an RRCConnectionResume message or an RRCConnectionReconfiguration message from a network node in the wireless network, the RRCConnectionResume message or the RRCConnectionReconfiguration message comprising a list of cells, wherein the list of cells comprises one or more New Radio (NR) cells;
determining the RRCConnectionResume message or the RRCConnectionReconfiguration message comprises an indication to perform SFTD measurements between the PCell and one or more NR neighbor cells;
based on the determination, performing SFTD measurements between the PCell and the one or more NR cells included in the list of cells; and
reporting, to the network node, the SFTD measurements in accordance with the list of cells for which the UE can report SFTD measurements.

2. The method of claim 1, further comprising determining no NR cell is configured as a Primary Secondary Cell (PSCell) of the UE.

3. The method of claim 1, further comprising determining the RRCConnectionResume message or the RRCConnectionReconfiguration message comprises a second field that specifies whether a PSCell is applicable.

4. The method of claim 3, wherein the determining the RRCConnectionResume message or the RRCConnectionReconfiguration message comprises the indication to perform SFTD measurements between the PCell and one or more NR neighbor cells is in response to the PSCell not being applicable.

5. The method of claim 1, wherein the RRCConnectionResume message or the RRCConnectionReconfiguration message further specifies whether the one or more NR neighbor cells are applicable.

6. The method of claim 5, wherein the reporting the SFTD measurements is in response to the one or more NR neighbor cells being applicable.

7. The method of claim 1, wherein the list of cells is specified by a field in a configuration report information element.

8. The method of claim 1, wherein the PCell comprises a NR cell.

9. The method of claim 1, wherein the PCell comprises a Long Term Evolution (LTE) cell.

10. A User Equipment (UE) for performing System Frame Number (SFN) Frame Time Difference (SFTD) measurements between a Primary Cell (PCell) of the UE and one or more other cells in a wireless network, the UE comprising:
an interface comprising radio front-end circuitry; and
processing circuitry associated with the interface, the processing circuitry configured to cause the UE to:
receive an RRCConnectionResume message or an RRCConnectionReconfiguration message, from a network node in the wireless network, the RRCConnectionResume message or the RRCConnectionReconfiguration message comprising a list of cells, wherein the list of cells comprises one or more New Radio (NR) cells;
determine the RRCConnectionResume message or the RRCConnectionReconfiguration message comprises a field that provides an indication to perform SFTD measurements between the PCell and one or more NR neighbor cells;
based on the determination, perform SFTD measurements between the PCell and the one or more NR cells included in the list of cells; and
report, to the network node, the SFTD measurements in accordance with the list of cells for which the UE can report SFTD measurements.

11. The UE of claim 10, the processing circuitry further configured to determine no NR cell is configured as a Primary Secondary Cell (PSCell) of the UE.

12. The UE of claim 10, the processing circuitry further configured to determine the RRCConnectionResume message or the RRCConnectionReconfiguration message comprises a second field that specifies whether a PSCell is applicable.

13. The UE of claim 12, the processing circuitry further configured to determine the RRCConnectionResume message or the RRCConnectionReconfiguration message comprises the indication to perform SFTD measurements between the PCell and the one or more NR neighbor cells in response to the PSCell not being applicable.

14. The UE of claim 10, the processing circuitry further configured to determine the RRCConnectionResume message or the RRCConnectionReconfiguration message comprises a second field that specifies whether the one or more NR neighbor cells are applicable.

15. The UE of claim 14, the processing circuitry further configured to report the SFTD measurements in response to the one or more NR neighbor cells being applicable.

16. The UE of claim 10, wherein the list of cells comprises the one or more NR neighbor cells.

17. The UE of claim 10, wherein the list of cells is specified by a field in a configuration report information element.

18. The UE of claim 10, wherein the PCell comprises a NR cell.

19. The UE of claim 10, wherein the PCell comprises a Long Term Evolution (LTE) cell.

* * * * *